(12) United States Patent
Yamori et al.

(10) Patent No.: US 7,453,941 B1
(45) Date of Patent: Nov. 18, 2008

(54) MOVING PICTURES ENCODING METHOD AND APPARATUS FOR DETECTING A SCENE CHANGE BETWEEN FIELDS OF AN INTERLACED IMAGE

(75) Inventors: Akihiro Yamori, Kawasaki (JP); Takashi Hamano, Kawasaki (JP); Kiyoshi Sakai, Kawasaki (JP); Kouji Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 847 days.

(21) Appl. No.: 09/526,619

(22) Filed: Mar. 16, 2000

(30) Foreign Application Priority Data

Mar. 18, 1999 (JP) ................................ 11-074497

(51) Int. Cl.
*H04N 7/12* (2006.01)
(52) U.S. Cl. ................................ 375/240.15
(58) Field of Classification Search ............ 375/240.01, 375/240.12, 240.13, 240.15, 240.16, 240.24, 375/240.26, 240.28; 382/232, 234, 236, 382/238; *H04N 7/12*
See application file for complete search history.

(56) References Cited

U.S. PATENT DOCUMENTS

| 5,694,170 A | * | 12/1997 | Tiwari et al. ................ 382/234 |
| 5,929,916 A | * | 7/1999 | Legall et al. ............ 375/240.24 |
| 6,430,223 B1 | * | 8/2002 | Lim ....................... 375/240.16 |

FOREIGN PATENT DOCUMENTS

| JP | 5-037900 | 2/1993 |
| JP | 6-46409 | 2/1994 |
| JP | 7-107460 | 4/1995 |
| JP | 7-240917 | 9/1995 |
| JP | 8-242452 | 9/1996 |
| JP | 8-265774 | 10/1996 |

OTHER PUBLICATIONS

Japanese Office Action dated Nov. 16, 2004.

* cited by examiner

*Primary Examiner*—Young Lee
(74) *Attorney, Agent, or Firm*—Katten Muchin Rosenman LLP

(57) ABSTRACT

An encoding method, which achieves encoding efficiency, and good picture quality encoding even when there exists a picture in which a scene change occurs within an interlaced frame, is provided. A moving pictures encoding method treats a frame of interlaced image input signals as a picture, and performs prediction and encoding for this picture in macro-block units from a picture of both a forward picture, which is temporally in the past, and a backward picture, which is in the future. When performing encoding in accordance with the above-mentioned bi-directional picture, the method performs inter-field motion prediction, which treats as a unit a field, which divides each picture in macro-blocks into either odd numbers or even numbers of pixel scanning lines of this frame, and as a prediction mode, selectively switches in picture units between using prediction from a forward field motion vector for one field, and using prediction from a backward field motion vector for the other field, generates a predictive picture corresponding to the selected prediction mode, and encodes the input signal using the generated predictive picture.

6 Claims, 18 Drawing Sheets

MOVING PICTURES ENCODING METHOD AND APPARATUS FOR DETECTING A SCENE CHANGE BETWEEN FIELDS OF AN INTERLACED IMAGE

BACKGROUND OF THE INVENTION

1. Field of the Invention

The present invention is related to a moving pictures encoding method, and an apparatus that uses same, which are applied to digital picture systems and applications, and picture databases utilized in a variety of fields, such as communications, broadcasting, data storage, and computers, and more particularly to a moving pictures encoding method, and an apparatus that uses same, which are advantageous when encoding picture data containing a scene change.

2. Description of the Related Art

In general, the amount of information comprising a moving picture itself is huge. For this reason, when encoding moving pictures, redundancy along a spatial axis is removed by using an orthogonal transform (discrete cosine transform) process and variable-length encoding. In addition, redundancy along a time axis is removed by finding the difference between the first and last frames, and encoding the difference data.

The constitution of a picture will be described here in order to understand the following explanation.

An interlaced picture, for which every other line of a single frame is scanned, and which constitutes an even field constituting only even-numbered scanning lines, and an odd field constituting only odd-numbered scanning lines, is currently used in TV formats (NTSC: National Television System Committee of the United States, PAL: Phase Alternation by Line of Europe).

MPEG-2 (Moving Pictures Experts Group) is an encoding scheme, which also corresponds to the encoding of interlaced pictures, and performs encoding, which takes frame/field into consideration for picture structure, and inter-picture motion prediction. These will be explained hereinbelow.

With MPEG-2, both frame allocation and field allocation are possible for a picture. When a frame is allocated as a picture, it is called a frame structure, and when a field is allocated, it is called a field structure. Encoding is performed by treating a picture as macro-block (MB) units.

FIG. 26 shows a frame structure macro-block MB1, and a field structure odd field macro-block MB2, and even field macro-block MB3. Each macro-block (MB) constitutes, for example, 16×16 pixels.

With MPEG-2, there is also frame prediction and field prediction, which are well-suited to encoding an interlaced picture, and one motion vector is used for frame prediction, and two motion vectors are used for field prediction.

Here, methods for the above-mentioned reduction of temporal redundancy can be broadly divided into 3 encoding methods in accordance with the scope of inter-picture prediction utilized.

The first is an intra-picture encoding method, wherein encoding is performed within a picture, the second is an inter-picture sequential predictive encoding method, wherein encoding is performed by also using inter-picture forward prediction. In addition, the third is a bi-directional predictive encoding method, wherein encoding is performed using two-directional inter-picture prediction, which combines the forward direction and the backward direction.

A picture by the above-mentioned first encoding method is called an I-picture (Intra-Picture), a picture by the second encoding method is called a P-picture (Predictive-Picture), and a picture by the third encoding method is called a B-picture (Bi-directionally predictive-Picture).

Further, from the standpoint of whether or not each type of picture can be used as an inter-picture predictive reference picture from another picture, an I-picture and a P-picture are referenced, but a B-picture is not referenced. Accordingly, an I-picture and a P-picture collectively are called a reference picture.

Furthermore, because the degree of temporal correlation is great between each picture of moving pictures, more redundancy can be removed from a P-picture, which utilizes a correlation with a forward picture, than from an I-picture. Further, more redundancy can be removed from a B-picture, which utilizes a correlation with a backward picture, than from a P-picture.

That is, viewed from the amount of data of pictures of the same picture quality, it is a relationship wherein an I-picture>P-picture>B-picture. Also, because a reference picture can at the least be used in motion prediction from another picture, and can constitute the original picture from which a predictive frame is generated, it is desirable that a reference picture be of the highest picture quality possible.

In this sense as well, a reference picture>non-reference picture is desirable with regard to amount of data.

However, efficiency cannot be said to be good if encoding is performed using only a P-picture or a B-picture, which have small amounts of data. This is because when an error occurs, the error is propagated temporally with the inter-picture encoding of a P-picture or B-picture.

Consequently, since this causes problems, it is desirable to refresh periodically with an I-picture. Actually, when encoding using a B-picture, it is common to perform encoding by changing the picture type, as shown in FIG. 27.

In FIG. 27, B indicates a B-picture, I indicates an I-picture, and P indicates a P-picture, and the same holds true for the other figures described hereinbelow. Further, an arrow of inter-picture prediction signifies that the predictive frame of the picture at the tip of an arrow is generated using the picture at the base of the arrow.

Incidentally, the size of the Group-of-Pictures (GOP) in the example of FIG. 27 is 12 pictures, that is, I-picture refresh is performed every 12 pictures. And the distance between each reference picture is 3 pictures.

Furthermore, inter-picture prediction is performed in macro-block units, which divide a picture into a plurality of blocks as described above, and determines the difference between a pixel unit and a block, wherein a coded picture macro-block is the same size as a reference picture.

And then, the cumulative sum thereof is treated as a prediction error, the block with the smallest prediction error is selected, and a predictive frame is generated. Next, difference data with an encoded macro-block is encoded. As the difference, the sum of absolute values of a simple pixel difference, the sum of squares of a pixel difference, and the like are utilized.

Here, when an I-picture is put to multiple uses, it is undesirable because the same scene is coded at the same picture quality, thereby increasing the amount of coded data. When encoding is performed at a fixed rate, picture unit data allocation becomes that much smaller, and picture quality deteriorates.

However, when scene changes and other inter-picture correlation is low, prediction efficiency deteriorates when inter-picture prediction is used, and in some cases, picture quality deteriorates even more than when intra-picture encoding is performed.

Therefore, as a measure against such trouble, there has been proposed a method, wherein, even when encoding is performed using an I-picture at a certain fixed interval, when a scene change SC is detected as shown in FIG. 28, the immediately succeeding picture is coded using I-picture intra-picture encoding.

When all is said and done, this method is undesirable because an I-picture, or an intra-picture coded picture is generated each time a scene change occurs, increasing the volume of coded data by that much.

Further, so as to prohibit to the utmost an increase in the frequency of an I-picture, as shown in FIG. 29, when a scene change occurs, the count value of the heretofore I-picture fixed interval cycle is reset. Then, there is a method, wherein GOP is once again reconfigured from the picture at reset time, and encoding is performed using a fixed interval cycle I-picture (for example, GOP size=12).

It might also be possible to have a method, wherein, when a scene change is generated in a B-picture as shown in FIG. 30, intra-picture prediction is held not with the B-picture thereof, but by making the reference picture that comes immediately thereafter in the input sequence either an I-picture or intra-frame encoding, and using inter-picture prediction from preceding and succeeding reference pictures.

However, in the case of the example shown in FIG. 30, if it is assumed that the encoding process is achieved in real-time using hardware, to include input-output apparatus in particular, there is absolutely no way of predicting the cycle at which a reference picture will appear. Therefore, picture memory management becomes more difficult than when a reference picture appears at a fixed cycle.

Further, when viewed from the aspect of data allocation, changing from a P-picture to an I-picture causes much less fluctuation of data allocation than changing from a B-picture to an I-picture, making it less likely that a stream buffer will exhibit an underflow or overflow state. As a result, the method of FIG. 30 is considered desirable.

However, even a control method like that shown in FIG. 30 has problems such as those hereinbelow.

Here, FIG. 31 is a diagram prepared for explaining the problem points in this FIG. 30. To simplify the explanation, nothing is shown other than a B-picture, which is a encoded picture, a forward reference picture, and a backward reference picture.

In general, in the case of a frame structure, in which a frame is encoded as a picture, inter-frame prediction and inter-field prediction are performed as inter-picture prediction.

More specifically, there are 3 forms of prediction in frame prediction: forward prediction, backward prediction, and bi-directional prediction, in which prediction is performed using a picture that combines predictive pictures obtained by predictions in both directions thereof. Similarly, in inter-field prediction as well, there are 3 forms of prediction: forward prediction, backward prediction, and bi-directional prediction, in which prediction is performed using a picture that combines predictive pictures obtained by predictions in both directions thereof.

Of the reference numbers of the motion vectors shown in FIG. 31, the numbers 5, 10 are frame vectors. Numbers 1, 2, 3, 4, 6, 7, 8, 9 are field predictions. Furthermore, in FIG. 31, the right field is the odd-numbered field, and the left field is shown as the even field.

In frame prediction, when using forward prediction, the vector that is selected is number 5, and when using backward prediction, the vector that is selected is the number 10 vector. When using bi-directional prediction, both the number 5 and 10 vectors are used.

Conversely, in field prediction, a predictive frame is generated using a motion vector in each of the odd and even fields.

In the case of forward prediction, the B-picture odd field generates a predictive frame using either the number 1 or 2 motion vector, and the even field generates a predictive frame using either the number 3 or 4 motion vector.

Similarly, in the case of backward prediction, the odd field uses either the number 6 or 7 motion vector, and the even field uses either the number 8 or 9 motion vector. In the case of bi-directional prediction, the odd field generates a reference frame by combining a forward predictive frame, which is generated using either the number 1 or 2 motion vector, and a backward predictive frame, which is generated using either the number 6 or 7 motion vector.

The even field generates a reference frame by combining a forward predictive frame, which is generated using either the number 3 or 4 motion vector, and a backward predictive frame, which is generated using either the number 8 or 9 motion vector.

The above is a method of motion prediction utilized in current MPEG-2 and other moving pictures encoding schemes. However, when a scene change occurs between the odd/even fields within an interlaced frame, the algorithms of current moving pictures encoding schemes only perform frame structure encoding, and in field prediction, one field is not able to perform forward prediction, while the other field performs backward prediction.

Consequently, in a relevant picture, encoding efficiency drops excessively, and picture quality deterioration becomes conspicuous. Further, since prediction is not applied between pictures, if there is an increase of macro-blocks, for which intra-picture encoding is performed using a B-picture, the significance of creating a reference picture of immediately thereafter using an I-picture or intra-picture encoding is also lost.

SUMMARY OF THE INVENTION

Therefore, an object of the present invention is to provide a moving pictures encoding method and apparatus, which are capable of achieving encoding efficiency and good picture quality encoding even when there exists a picture so that a scene change occurs between the odd/even fields within an interlaced frame.

Further, an object of the present invention is to provide a moving pictures encoding method and apparatus, which achieve good encoding efficiency and picture quality in accordance with adding a prediction mode, and appropriately switching encoding schemes, and switching input data.

As a first constitution of a moving pictures encoding method and apparatus of the present invention, which achieves the above-mentioned goals, is a method and apparatus, which performs moving pictures encoding having a picture, which treats a frame of input signals of an interlaced image as a picture, and which predicts and encodes this picture in macro-block units from both a forward picture, which is temporally in the past, and a backward picture, which is in the future, this method and apparatus being characterized in that, when encoding is performed by predictions from the above-mentioned bi-directional pictures, there is performed motion prediction between fields, which treat as a unit a field, which divides each picture in macro-block units into either odd numbers or even numbers of pixel scanning lines of this frame, and as a predictive mode, the use of prediction from either the forward field motion vector for one field, or the backward field motion vector for the other field is selected and switched in picture units, a predictive picture corresponding to this selected predictive mode is generated, and the above-mentioned input signals are encoded using the generated predictive picture.

As a second constitution, a moving pictures encoding method and apparatus are characterized in that, when encoding is performed by a prediction from the above-mentioned bi-directional picture, there is performed motion prediction between fields, which treat as a unit a field, which divides each picture in macro-block units into either odd numbers or even numbers of pixel scanning lines of this frame, and as a predictive mode, predictions from the forward field motion vector for one field, and the backward field motion vector for the other field are constantly used, a predictive picture corresponding to the above-mentioned predictive mode is generated, and input signals are encoded using the generated predictive picture.

Furthermore, the moving pictures encoding method and apparatus according to the first constitution is characterized in that a scene change of the above-mentioned input signal picture is detected in a field unit divided into either odd numbers or even numbers of pixel scanning lines of the above-mentioned frame, and relative to a picture, in which a scene change exists between fields within the above-mentioned frame in the above-mentioned input signal picture, a prediction from a forward field motion vector for one field, and a backward field motion vector for the other field are treated as a selection item.

Further, as a fourth characteristic, a moving pictures encoding method and apparatus, which performs encoding by treating an interlaced image as input signals, and treating a macro-block as a unit, this moving pictures encoding method and apparatus being characterized in that a scene change on the above-mentioned input signal picture is detected in a field unit divided into either odd numbers or even numbers of pixel scanning lines of a frame, and the fields of the above-mentioned input signal picture are encoded as pictures for a picture, for which inter-picture prediction is performed at the least from both a forward picture that is temporally in the past, and a backward picture that is in the future, and for a picture, in which a scene change exists between intra-frame fields in the above-mentioned input signal picture.

As a fifth characteristic, a moving pictures encoding method and apparatus, which performs encoding by treating an interlaced image as input signals, and treating a macro-block as a unit, this moving pictures encoding method and apparatus being characterized in that a scene change on the above-mentioned input signal picture is detected in a field unit divided into either odd numbers or even numbers of pixel scanning lines of a frame, and for a picture, for which inter-picture prediction is performed from both a forward picture that is at least temporally in the past, and a backward picture that is in the future, and either the above-mentioned forward picture, or backward picture is encoded as the same data for a picture, in which a scene change exists between intra-frame fields in the above-mentioned input signal picture.

Furthermore, as a sixth characteristic, the moving pictures encoding method and apparatus according to the fifth characteristic, are characterized in that encoding, which treats the above-mentioned picture as the same data as either a forward reference picture or a backward reference picture, is performed by fixing the encoding prediction direction to one direction frame prediction, making the motion vector always equal 0, and also making the encoding difference data always equal 0.

And furthermore, as a seventh characteristic, the moving pictures encoding method and apparatus according to the fifth characteristic, are characterized in that encoding, which treats the above-mentioned picture as the same data as either a forward reference picture or a backward reference picture, sets either a forward reference picture or a backward reference picture as the current frame picture when setting the coded original picture.

Further, as an eighth characteristic, a moving pictures encoding method and apparatus, which inputs an interlaced picture as an input signal, this method and apparatus being characterized in that a scene change on the above-mentioned input signal picture is detected in a field unit divided into either odd numbers or even numbers of pixel scanning lines of a frame of this picture, and one field is repeatedly outputted relative to a picture, in which a scene change exists between intra-frame fields in the above-mentioned input signal picture.

As a ninth characteristic, a moving pictures encoding method and apparatus, which performs encoding by treating a frame of input signals of an interlaced image as a picture, and by treating a macro-block as a unit, this moving pictures encoding method and apparatus being characterized in that a scene change on the above-mentioned input signal picture is detected in a field unit divided into either odd numbers or even numbers of pixel scanning lines of a frame, and one field of a picture is repeatedly outputted when this picture is such that prediction is performed from both a forward picture that is temporally in the past, and a backward picture that is in the future, and a scene change exists between intra-frame fields in these input signals.

As a tenth characteristic, a moving pictures encoding method and apparatus according to any of the first through the third characteristics, are characterized in that there is performed motion compensation, which corresponds to encoded moving pictures encoding, and which corresponds to prediction from a forward field motion vector for one field, and a backward field motion vector for the other field.

Further characteristics of the present invention will become clear from the hereinbelow description in accordance with the figures of the aspects of the embodiments of the invention.

DESCRIPTION OF THE PREFERRED EMBODIMENTS

Figure 1:
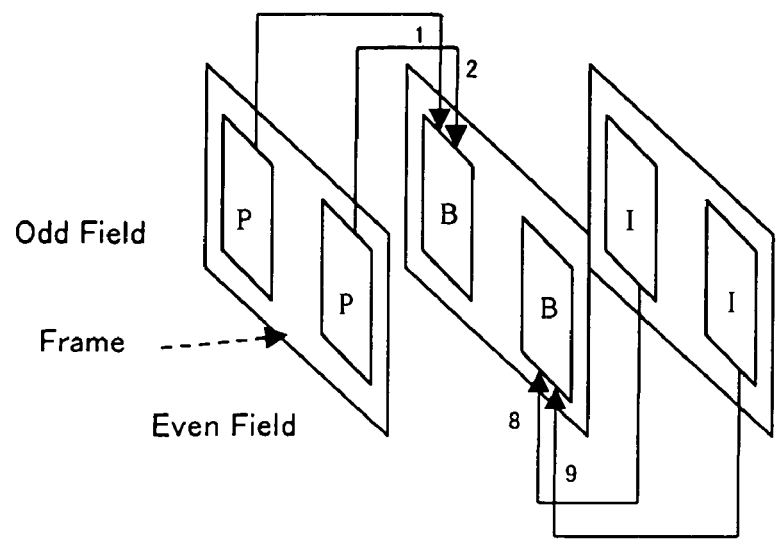
FIG. 1 is a diagram illustrating a first solution principle of the present invention.

Aspects of the embodiments of the present invention will be described hereinbelow in accordance with the figures. Furthermore, the same or similar parts in the figures will be described by appending the same reference numeral or reference symbol.

FIG. 1 is a diagram illustrating a first solution principle of the present invention. In the figure, P, B, and I, respectively, indicate a P-picture, B-picture, and I-picture, as was explained in FIG. 26 through FIG. 31 above.

The characteristic of the solution principle of FIG. 1 lies in the fact that a prediction mode is added at the time of a B-picture during frame structure encoding. Enabling the carrying out of prediction, wherein one field is forward prediction, and the other field is backward prediction, makes it possible to perform prediction efficiently.

Figure 31:
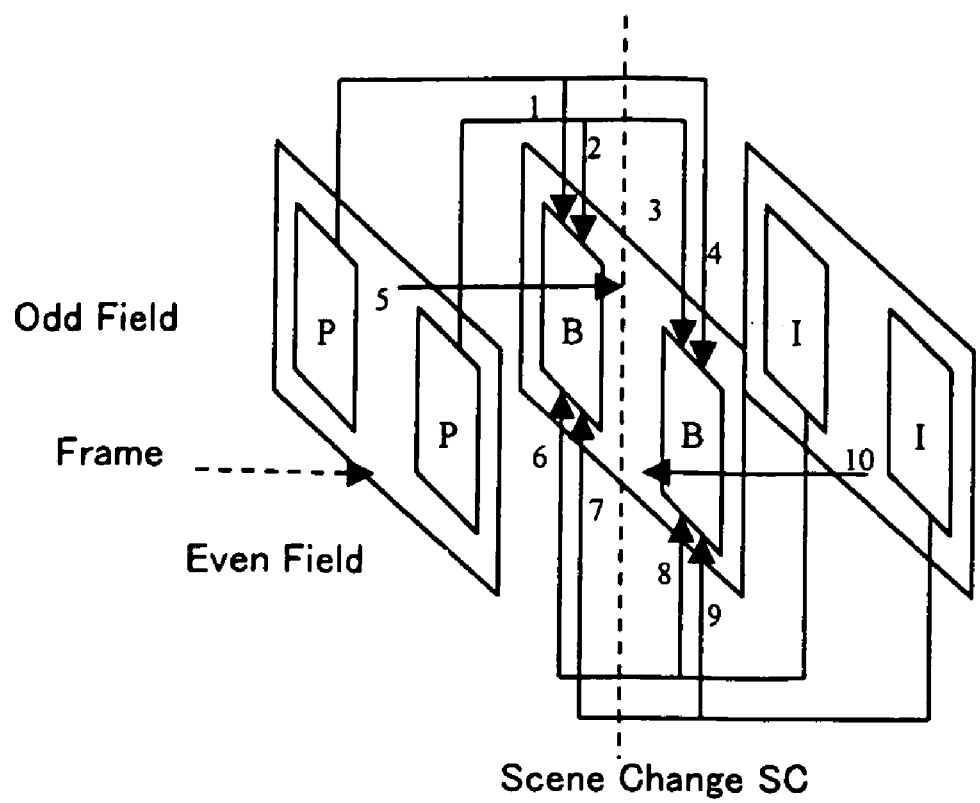
FIG. 31 is a diagram for describing the problem points in FIG. 29.

In FIG. 1, as is clear from comparison with FIG. 31, the B-picture of the odd field performs forward prediction, and the B-picture of the even field performs backward prediction. That is, prediction is possible when the odd field uses either the 1 or 2 motion vector, and when the even field uses either the 8 or 9 motion vector.

Furthermore, in encoding, when a motion prediction mode is added, a decodable decoding scheme must be prepared even when the prediction mode added thereto is included.

Figure 2:
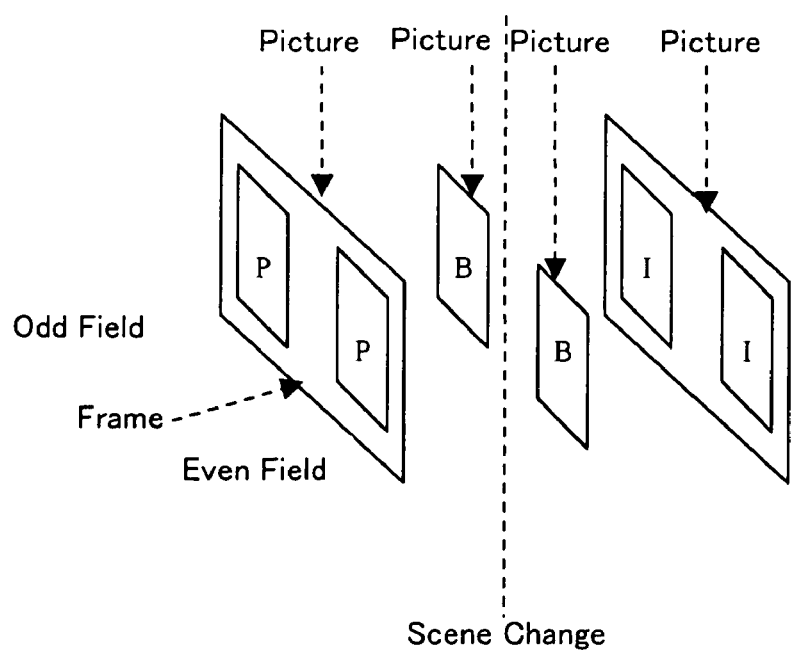
FIG. 2 is a diagram illustrating a second solution principle of the present invention.

Next, a second solution principle according to the present invention is a method, which does not add a prediction mode. FIG. 2 is a diagram illustrating the second solution principle of the present invention. The second solution principle is a method, wherein, in a B-picture, in which a scene change is detected at the least between fields within a relevant frame, field structure encoding is performed as two field pictures for this frame.

That is, as shown in FIG. 2, when a scene change is detected between the odd/even fields of a B-picture, the odd/even fields of the B-picture thereof undergo encoding processing as two field pictures.

So doing enables inter-picture prediction, wherein one field of the two fields is forward prediction, and the other field is backward prediction, making it possible to perform efficient prediction.

Furthermore, as a third solution principle of the present invention, there is a case, in which a prediction mode is not added, and a picture structure is not changed. In this case, because it is impossible to perform efficient inter-picture prediction, a coded picture is pasted via inter-picture prediction to either a forward or a backward reference frame, or input signals are manipulated, and encoding is performed as a frame that differs from the actual original picture.

This enables encoding which does not reduce encoding efficiency. For example, as shown in FIG. 3, in a picture (in FIG. 3, picture B), in which a scene change occurs at the least between intra-frame fields, a coded frame is encoded so that the picture thereof constitutes the same data as that of either a forward reference picture or a backward reference picture.

Figure 3:
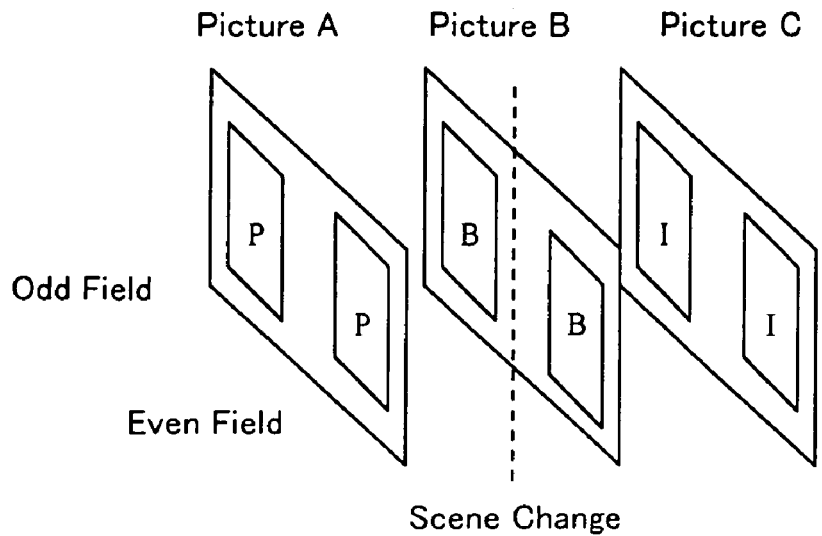
FIG. 3 is a diagram illustrating a third solution principle of the present invention.

In the case of FIG. 3, encoding is performed so that the picture constitutes the same data as a forward reference picture. That is, as shown in Table 1, in the encoding of input of picture B, encoding is performed so that picture B constitutes the same data as picture A. However, especially when a plurality of sequential B-pictures exist, it is desirable to presume that [picture B] is the same data as the closest reference picture.

TABLE 1

Third Solution Principle of the Present Invention

| Input | Picture A | Picture B | Picture C |
|---|---|---|---|
| Encoded Data | Picture A | Picture A | Picture C |

Further, viewed over time, when another B-picture exists between a B-picture to be coded and a reference picture, it is desirable to also encode the pertinent B-picture as the same data as the reference picture. This is to maintain the continuity of a picture when an encoded stream is reproduced.

Figure 4:
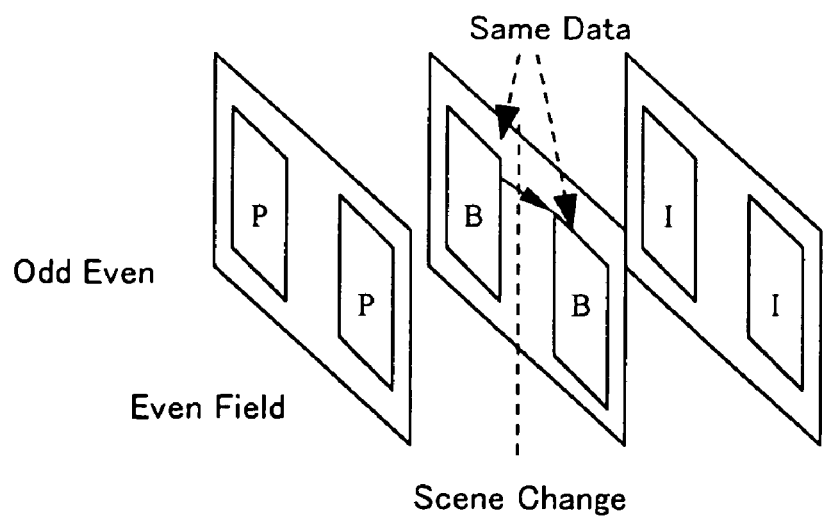
FIG. 4 is a diagram illustrating a fourth solution principle of the present invention.

As a method for encoding a picture as a frame that differs from the actual encoded picture, there is yet another method according to the present invention. This is a method, wherein, when a scene change is detected between intra-frame fields as shown in FIG. 4, one of the fields of the picture thereof is repeated for the pertinent frame.

In the scene following repetition in accordance therewith, a scene change can be made in frame units. Encoding efficiency increases as a result thereof. This method of repeating one field can be carried out by looking only at input data that is not particularly related to encoding.

Next, embodiments for realizing the above-mentioned solution principles of the present invention will be described. But prior to the descriptions thereof, to make it easier to understand the present invention, an example of a common constitution of an encoding apparatus, to which a solution principle of the present invention is applied, will be described.

Figure 5:
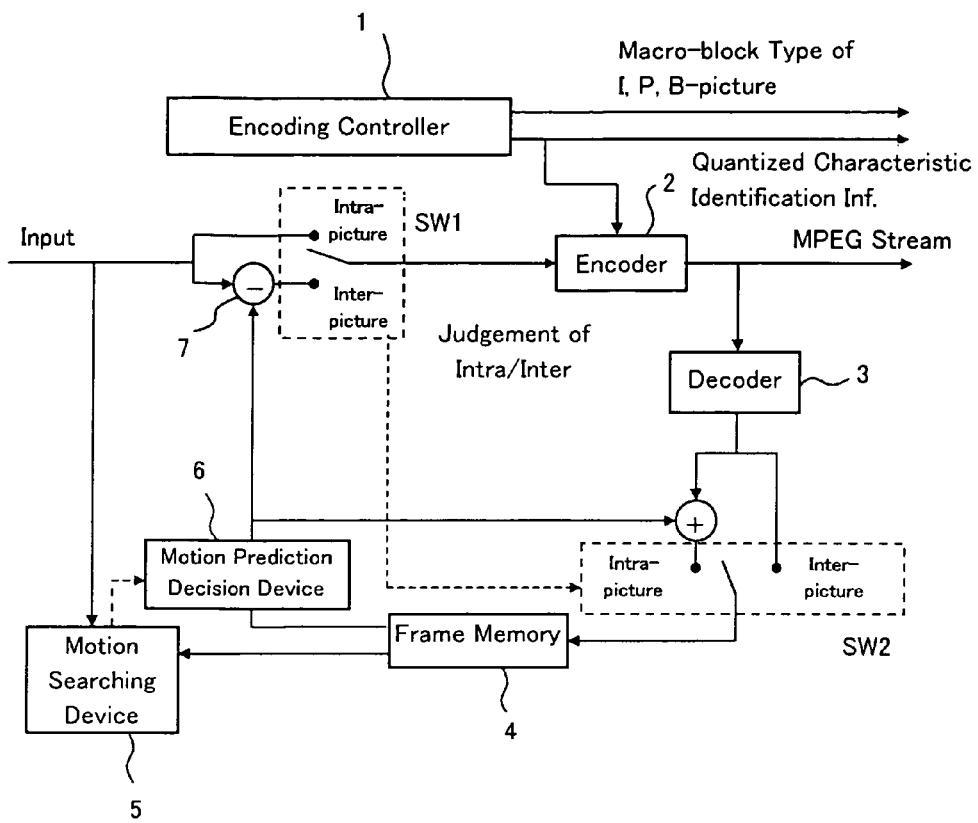
FIG. 5 is a block diagram of an example of a common constitution of an encoding apparatus to which a solution principle of the present invention is applied.

FIG. 5 shows a block diagram of an example of a common constitution of an encoding apparatus to which a solution principle of the present invention is applied. The sequence of an I-picture, P-picture, and B-picture is controlled in accordance with an encoding controller 1, and in correspondence therewith, switches SW1, SW2 switch to either the intra-picture encoding (intra) side, or the inter-picture encoding (inter) side.

An encoder 2 is constituted from an orthogonal transform circuit and a quantizing circuit. In accordance therewith, spatial compression, and data structure-based data quantity reduction are possible. An MPEG-coded data stream is outputted from the encoder 2.

Conversely, the output of the encoder 2 is inputted to a decoder 3, and a decoding process corresponding to the encoding process of the encoder 2 is performed. Then, the decoded picture data is stored in frame memory 4, and utilized in motion search and motion compensation processing.

Figure 6:
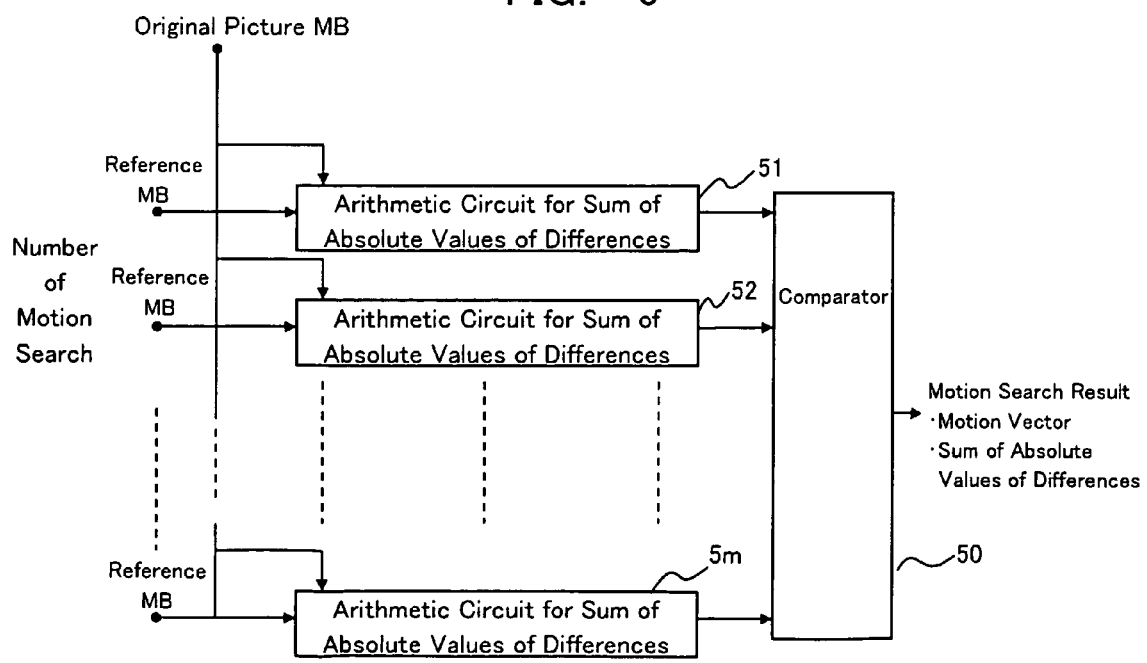
FIG. 6 is a block diagram showing an example of a constitution of the motion searching device 5 in the constitution of FIG. 5.
Figure 27:
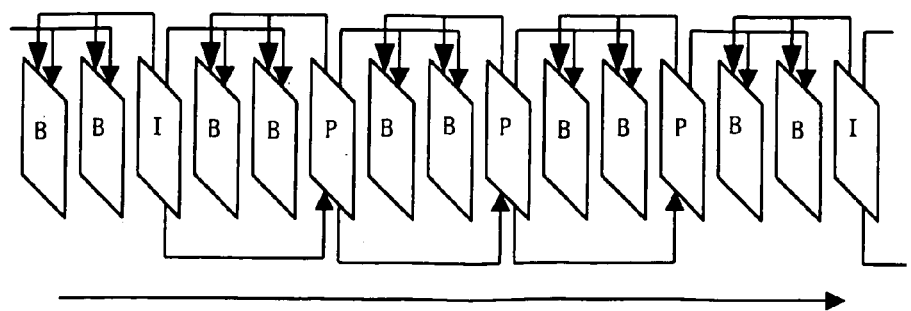
FIG. 27 is a diagram illustrating the changing of a picture type when encoding using a B-picture.
Figure 28:
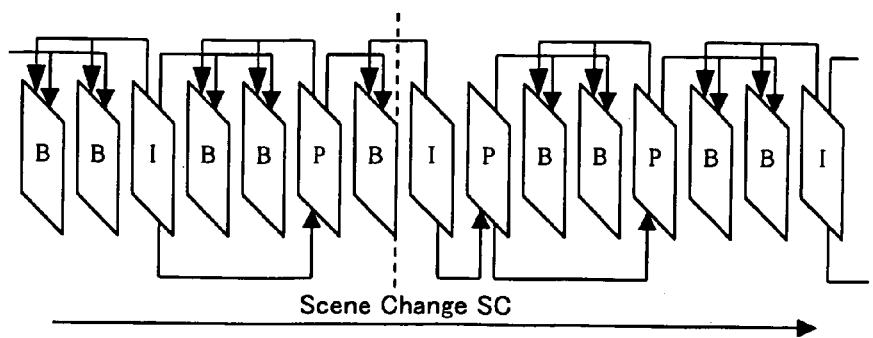
FIG. 28 is a diagram illustrating a method, wherein the immediately succeeding picture of when a scene change SC is detected is encoded using an I-picture or other intra-picture encoding scheme.
Figure 29:
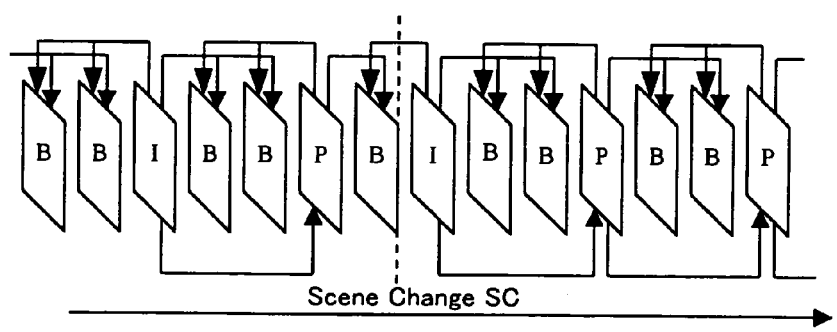
FIG. 29 is a diagram illustrating a method, wherein the count value of an I-picture fixed interval cycle is reset when a scene change occurs so as to prohibit I-picture frequency from increasing as much as possible.
Figure 30:
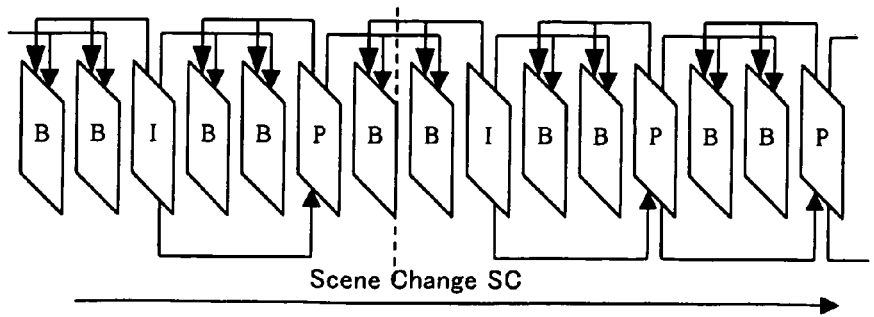
FIG. 30 is a diagram illustrating a method, wherein, when a scene change occurs in a picture, the reference picture that comes immediately thereafter in the input sequence uses either an I-picture or intra-frame encoding.

An example of a constitution of a motion searching device 5 is shown in FIG. 6, and has m-number of sums of absolute values of differences arithmetic circuits 5*l*-5*m*, into which respective data from m-number of macro-blocks, which constitute the reference picture search range shown in FIG. 27, are inputted, and a comparator 50 for inputting the output of m-number of sums of absolute values of differences arithmetic circuits 5*l*-5*m*, and selecting and outputting a minimum value.

Here, the above-mentioned m-number of macro-blocks are produced by shifting horizontally, and vertically one pixel at a time in a reference picture search range, having, for example, 16×16 pixels as one macro-block unit.

Each pixel of an original picture macro-block is inputted in common to the respective input terminals of the sums of absolute values of differences arithmetic circuits 5*l*-5*m*.

Figure 7:
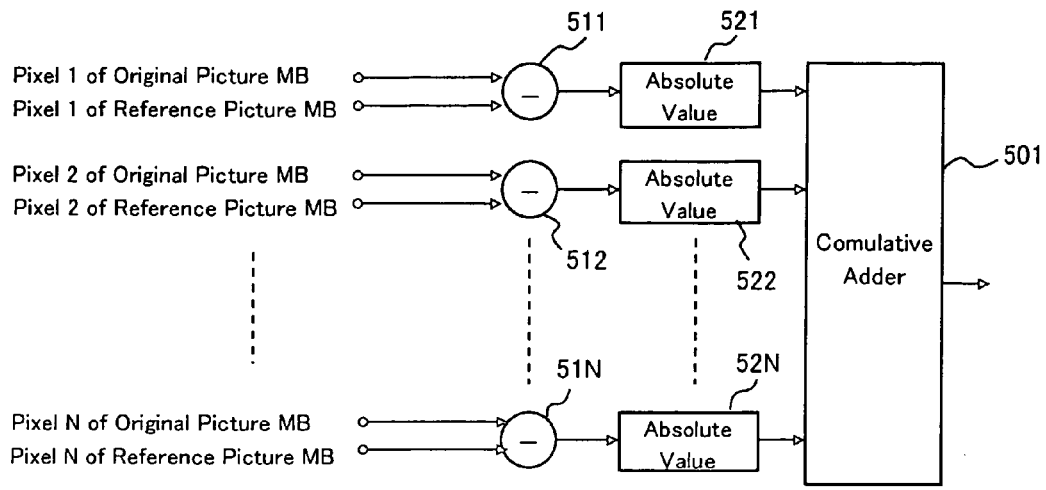
FIG. 7 is a block diagram of an example of a constitution of the sums of absolute values of differences arithmetic circuit 5*l*-5*m* of FIG. 6.

The sums of absolute values of differences arithmetic circuits 5*l*-5*m* of FIG. 6 have a constitution that is common to all, and a block diagram of an example of the constitution thereof is shown in FIG. 7. The constitution shown in FIG. 7 has absolute value arithmetic circuits 52*l*-52N, and difference circuits 51*l*-51N of a number corresponding to the number of pixels N constituting a single macro-block.

Furthermore, the constitution has a cumulative adder 501, which cumulatively adds the outputs of the absolute value arithmetic circuits 52*l*-52N. Here, when one macro-block constitutes 16×16 pixels as described above, N is 246.

The comparator 50 in FIG. 6 is inputted with outputs from the sums of absolute values of differences arithmetic circuits 5*l*-5*m*, which correspond to the plurality m-number of macro-blocks, and selects the output of the sums of absolute values of differences arithmetic circuits 5*l*-5*m* with the minimum value.

That is, in the reference picture search range, the macro-block with the strongest correlation to the original picture macro-block is selected, and a motion vector (quantity of movement) and sum of absolute values of differences are outputted as motion search results.

Furthermore, a motion prediction decision device 6, in outputting the minimum value of the sums of absolute values of differences between a reference picture and an original picture as described above, the minimum value of the sums of absolute values of differences in the forward direction, that is, with a past reference picture, the minimum value of the sums of absolute values of differences in the backward direction, that is, with a future reference picture, and the minimum value of the sums of absolute values of differences with reference pictures in both directions are outputted.

Furthermore, for sums of absolute values of differences with a reference picture, a frame sum of absolute values of differences is outputted in the case of frame prediction, and a field prediction sum of absolute values of differences is outputted in the case of field prediction.

Here, the sum of absolute values of differences of a frame prediction is the 16×16 pixel sum of absolute values of differences minimum value in the above-mentioned example, and sum of absolute values of differences of a field prediction is the sum of an odd 16×8 pixel scanning line sum of absolute values of differences minimum value and an even 16×8 pixel scanning line sum of absolute values of differences.

Figure 8:
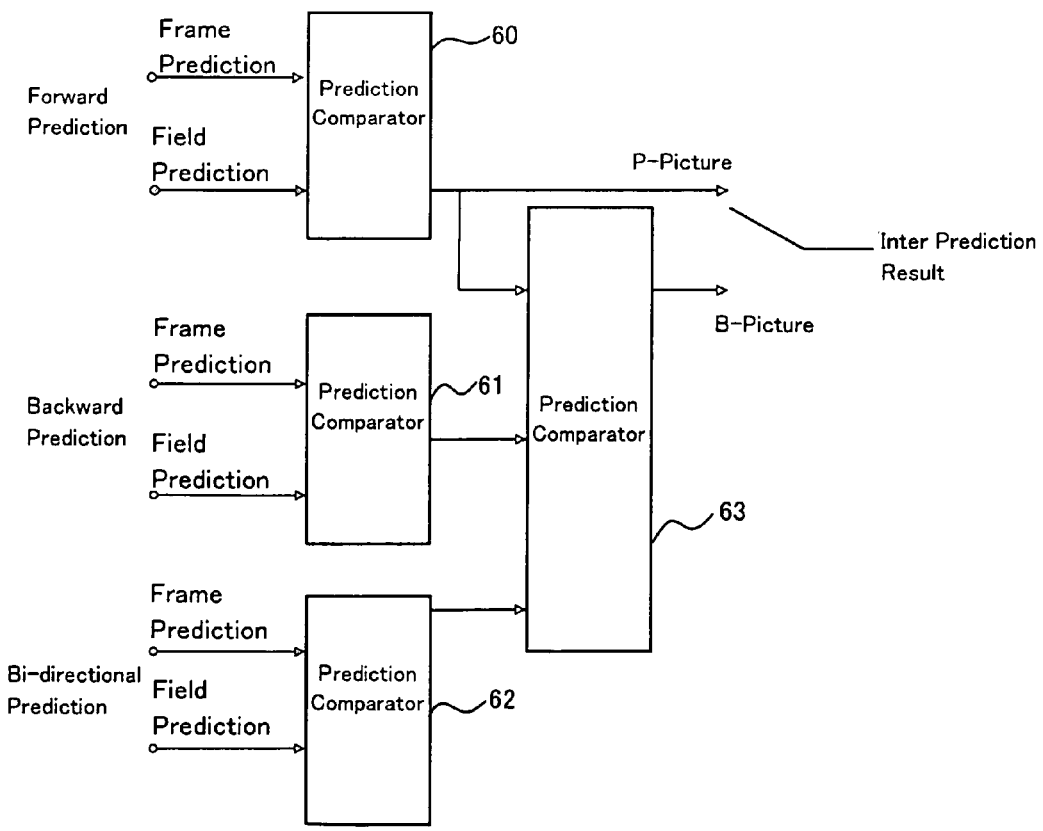
FIG. 8 is a block diagram of an example of a motion prediction decision device 6.

These absolute values of differences are inputted to the motion prediction decision device 6. FIG. 8 is a block diagram of an example of a constitution of a motion prediction decision device 6. There are prediction comparators 60, 61, and 62 corresponding to forward prediction, backward prediction, and bi-directional prediction. Each prediction comparator compares a frame prediction sum of absolute values of differences against a field prediction sum of absolute values of differences, and outputs the smallest thereof.

Meanwhile, the switching selection of either P-picture encoding or B-picture encoding is controlled in accordance with control by the encoding controller 1. At P-picture encoding, either the frame prediction sum of absolute values of differences, or the field prediction sum of absolute values of differences selected by prediction comparator 60 is outputted as the prediction result.

Further, at B-picture encoding, the outputs of prediction comparators 60, 61, and 62 are inputted into prediction comparator 63, the minimum value thereof is selected, and outputted as the output of the motion prediction decision device 6.

The prediction decision types and motion vectors in a motion prediction decision device 6 are as shown in Table 2 hereinbelow.

TABLE 2

Relation Between Prediction Type and Number of Vectors

| Prediction Type | Forward Prediction | | Backward Prediction | | Bi-directional Prediction | |
|---|---|---|---|---|---|---|
| | Frame | Field | Frame | Field | Frame | Field |
| MV Count | 1 | 2 | 1 | 2 | 2 | 4 |
| MV Count/ Direction | 1 | 2 | 1 | 2 | 1 | 2 |

The output of the motion prediction decision device 6 is switched at inter-picture encoding to the difference circuit 7 by switch SW1 in accordance with encoding controller 1. Therefore, the difference between the input picture data and the prediction result of the motion prediction decision device 6 is outputted by the difference circuit 7, and inputted to the encoder 2.

Next, a constitution, which realizes a solution principle of the present invention described in FIG. 1 through FIG. 4 of the present invention will be described relative to the common encoding apparatus of the above-mentioned FIG. 5 through FIG. 8.

Figure 9:
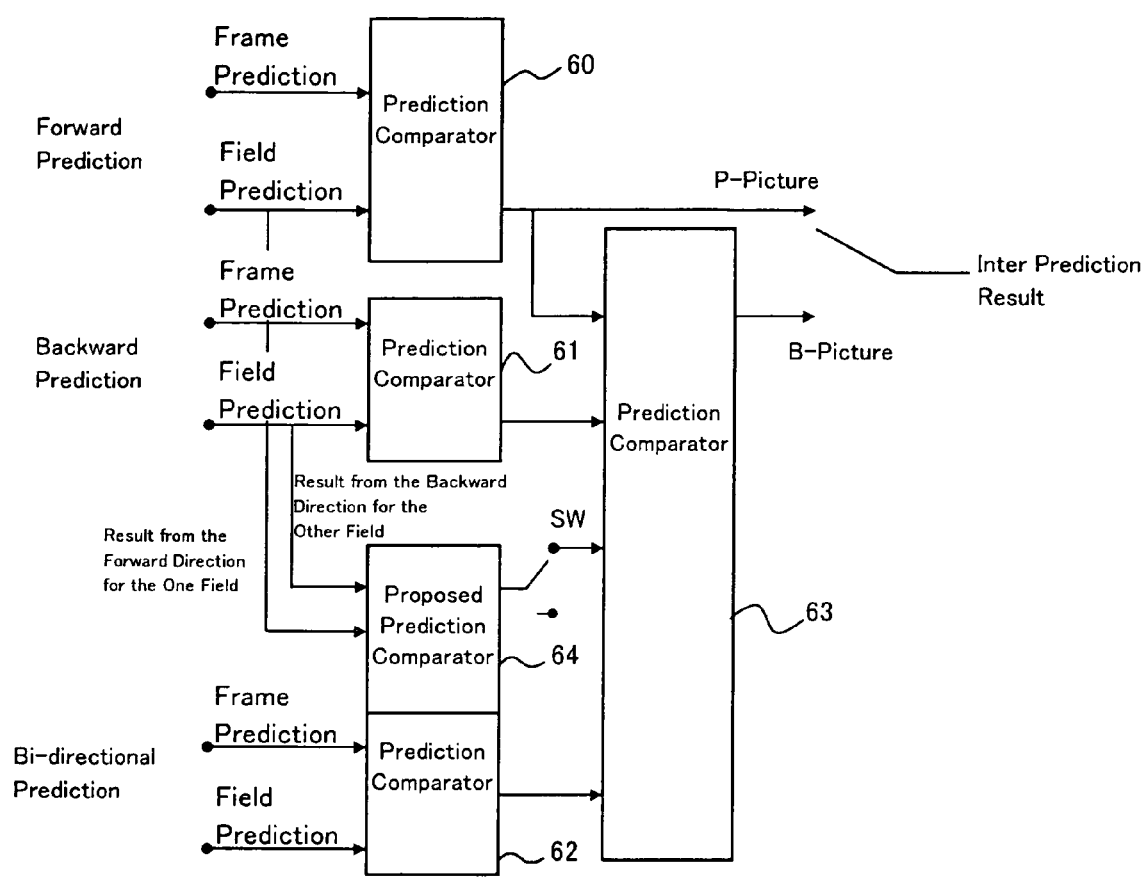
FIG. 9 is a block diagram of an example of a constitution of a motion prediction decision device 6, which, as a first embodiment of the present invention, realizes the first solution principle of the present invention.

FIG. 9 is a block diagram of an example of a constitution of a motion prediction decision device 6, which, as a first embodiment of the present invention, realizes the above-mentioned first solution principle of the present invention. The present invention is characterized by the fact that it provides yet another prediction comparator 64 relative to the constitution of the motion prediction decision device 6 of FIG. 8.

Frame structure encoding realized by the embodiment shown in FIG. 9, as the first solution principle of the present invention illustrated in FIG. 1, adds a predictive mode, which, in B-picture field prediction, performs prediction from the forward direction for one field, and prediction from the backward direction for the other field.

To add this predictive mode, there is a possibility that an additional bit will be required in a macro-block unit from the standpoint of the syntax (data string convention). Therefore, this predictive mode is advantageous in that the constitution enables ON/OFF in picture units.

As a method for same, there is selected motion prediction, which performs prediction from the forward direction for one field, and from the backward direction for the other field, just like the frame prediction and field prediction performed by the motion prediction of heretofore, and which also computes the prediction error of 1 direction 1 vector field prediction, and shows the minimum prediction error via prediction comparator 63.

Furthermore, the switch SW in FIG. 9 is provided for switching in accordance with whether or not a prediction mode, wherein prediction is performed from the forward direction for one field, and from the backward direction for the other field, is to be applied in picture field prediction, which uses the bi-directional prediction of the present invention.

Here, the prediction types and number of vectors in the embodiment of FIG. 9 are as shown in Table 3 hereinbelow.

TABLE 3

Relation Between Prediction Type and Number of Vectors

| Prediction Type | Forward Prediction | | Backward Prediction | | Bi-directional Prediction | | |
|---|---|---|---|---|---|---|---|
| | Frame | Field | Frame | Field | Frame | Field | Field2 |
| MV Count | 1 | 2 | 1 | 2 | 2 | 4 | 2 |
| MV Count/ Direction | 1 | 2 | 1 | 2 | 1 | 2 | 1 |

In Table 3, field prediction on the bi-directional side is conventional, the same as in Table 2. Field 2 prediction on the bi-directional side is added in accordance with the present invention, and there is 1 motion vector per direction. Field 2 prediction therefore has 2 motion vectors for forward/backward prediction.

Figure 10:
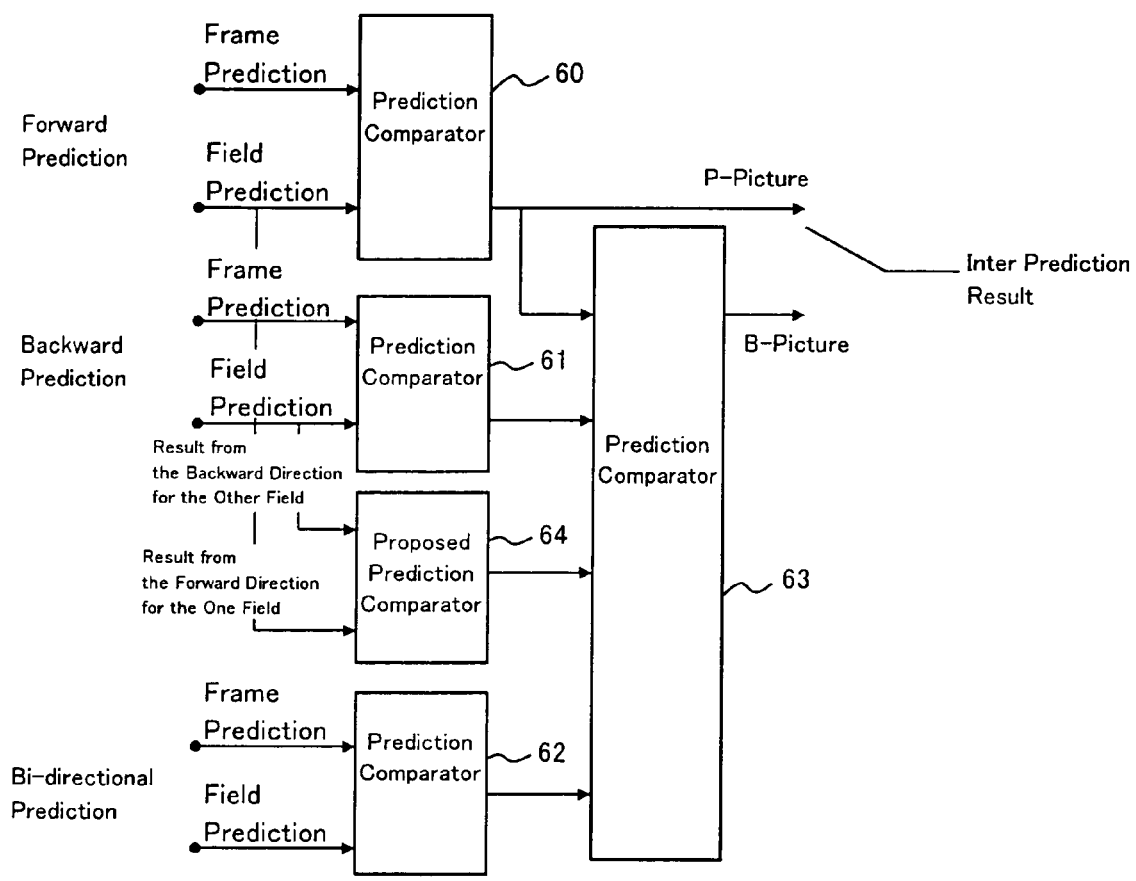
FIG. 10 is a block diagram of an example of a constitution of a motion prediction decision device 6 according to a second embodiment of the present invention.

FIG. 10 is a block diagram of an example of a constitution of a motion prediction decision device 6 according to yet a second embodiment of the present invention. The constitution is such that the output of prediction comparator 64, which is added relative to the embodiment of FIG. 9, is constantly inputted to prediction comparator 63.

Therefore, the constitution is such that, for a B-picture, prediction, which is always from a forward field prediction result for one field, and from a backward field prediction result for the other field, is entered into an item.

As described above, according to the present invention, a prediction mode, wherein there is 1 motion vector per direction in field prediction, is added as a new prediction mode.

Table 4 is a code table for an MPEG-2 frame structure prediction mode (Table 6-17 Meaning of frame#motion#type: ISO/IEC 13818-2 (MPEG-2-Video) definition of frame#motion#type).

TABLE 4

| Code | Spatial Temporal Weight Class | Prediction Type | Motion vector Count | Mv format | dmv |
|---|---|---|---|---|---|
| 00 | | Reserved | | | |
| 01 | 0, 1 | Field-based | 2 | Field | 0 |
| 01 | 2, 3 | Field-based | 1 | Field | 0 |
| 10 | 0, 1, 2, 3 | Frame-based | 1 | Frame | 0 |
| 11 | 0, 2, 3 | Dual-Prime | 1 | Field | 1 |

Here, to realize the addition of a prediction mode without increasing code bits at all, as shown in Table 5 hereinbelow, this prediction mode can be allocated to code '00', which is allocated to 'reserved' of Prediction type of the above Table 4.

TABLE 5

| 00 | 0, 1 | Field-based | 1 | Field | 0 |

Here, in the mode to be added, it is possible to have a case in which the odd field (top#field) is forward prediction, and the even field (bottom#field) is backward prediction, and, contrary thereto, a case in which the even field (bottom#field) is forward prediction, and the odd field (top#field) is backward prediction.

To increase motion prediction efficiency when a scene change occurs between intra-frame fields, the field that exists first in terms of input time can perform forward prediction, and the field that exists thereafter in terms of input time can perform backward prediction.

With MPEG-2, because an interlaced picture constitutes 1 frame, a 1-bit flag called top#field#first#flag, which exists in Picture encoding extension, can be referenced to determine which field exists first temporally.

Figure 11A:
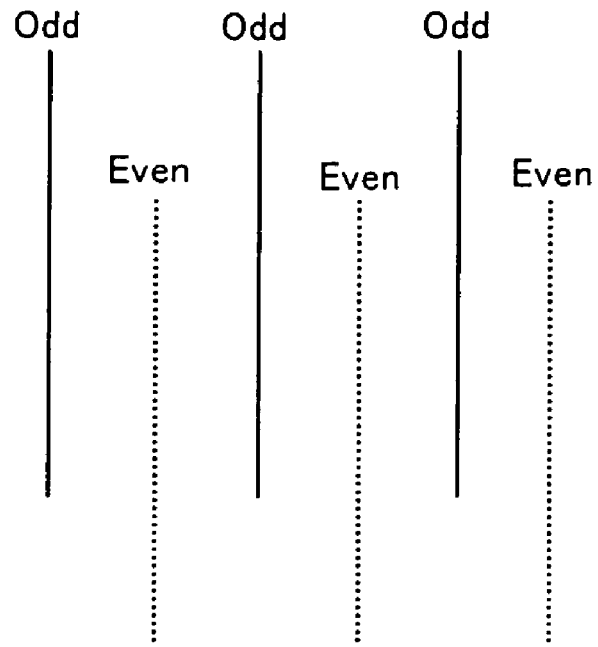
FIGS. 11A and 11B are diagrams illustrating the physical relationship of an odd field and an even field.
Figure 11B:
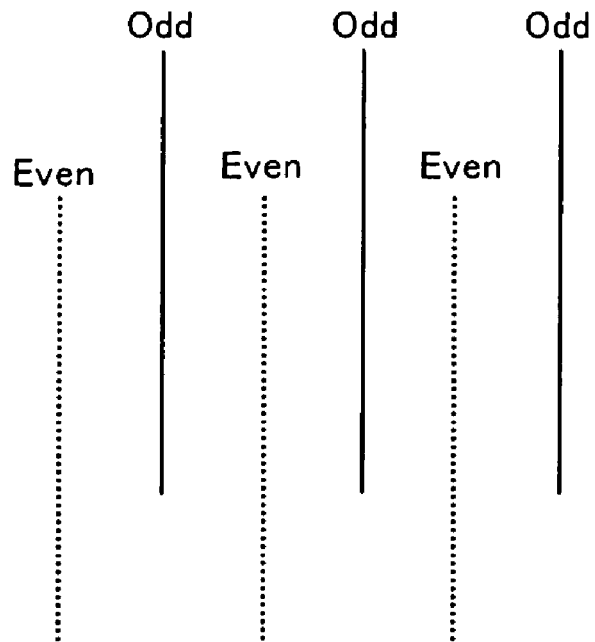

That is, when the top#field#first#flag=1, FIG. 11A pertains, and the odd field can perform forward prediction. By contrast, when top#field#first#flag=0, FIG. 11B pertains, and the even field can perform forward prediction.

In other words, since the field that is to perform forward prediction using the newly added field prediction is uniformly decided by the top#field#first#flag, which exists in Picture encoding extension, there is no need to provide a new flag.

Further, a motion vector is also a field prediction, and since the vector count is 1 vector for one field, a motion vector can be sent just like in frame prediction.

In the above-described second embodiment, since no additional bits are required from the standpoint of the MPEG-2 syntax, it is desirable for this prediction to be ON at all times.

Figure 12:
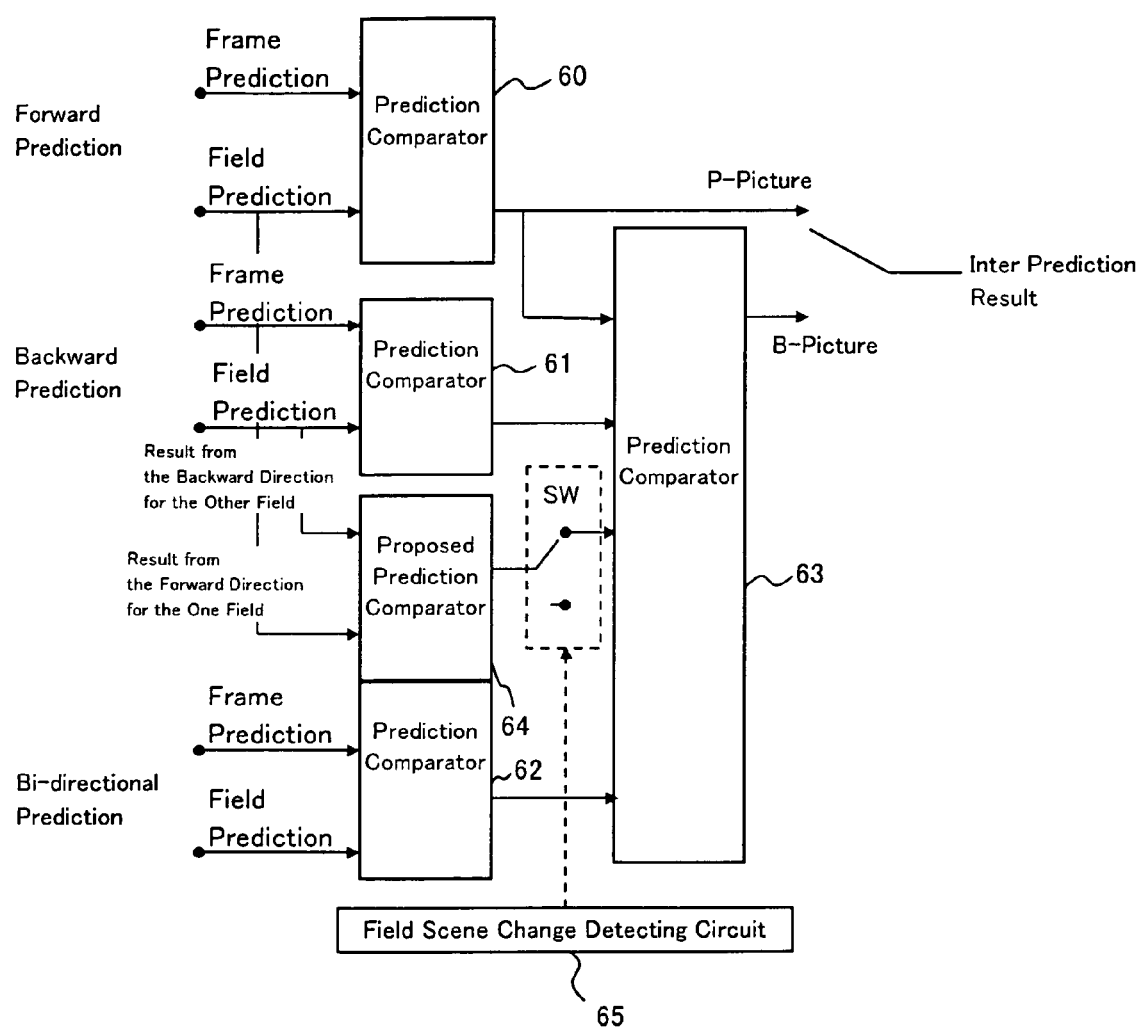
FIG. 12 is a diagram illustrating a third embodiment of the present invention.

FIG. 12 is a diagram illustrating a third embodiment of the present invention. The constitution of FIG. 12 is such that, relative to the constitution of FIG. 9, the switching of the switch SW is controlled by a field scene change detecting circuit 65.

Now, in relation to the above description of the second embodiment, the '00' of the code column in the above Table 3 becomes a 'reserved' bit in order to make the MPEG start code, which commonly holds a 0 in bit 23 and a 1 in bit 1, a unique word.

Therefore, when it is impossible to allocate a new motion prediction type to '00', either the bits of a frame#motion#type must be increased 1 bit, or a new, at the minimum 1-bit mode identification bit must be provided.

In this case, since motion prediction is performed in macroblock units, for example, even if an additional bit is 1 bit, when conversion is carried out per picture, it constitutes a huge increase in bit quantity. Furthermore, it is very possible that efficiency is raised in accordance with the addition of this bit only in a picture in which a scene change occurs between intra-frame fields.

Therefore, in the third embodiment, when an ON/OFF flag of an additional motion prediction mode in the first embodiment is provided, a scene change occurs between intra-frame fields, and the picture thereof is a B-picture, the flag thereof is set to ON.

As shown in FIG. 12, a scene changing circuit 65 is provided as a circuit that generates a field scene change detection flag. In accordance therewith, in a B-picture in which a field scene change occurs, there is added a prediction mode such that, using field prediction, prediction is performed from the forward direction for one field, and prediction is performed from the backward direction for the other field.

In accordance with so doing, the additional bits of the code quantity in accordance with a mode addition in a B-picture in which a field scene change does not occur is at the most 1 bit, making it possible to hold the increase of the code quantity in check.

Figure 13:
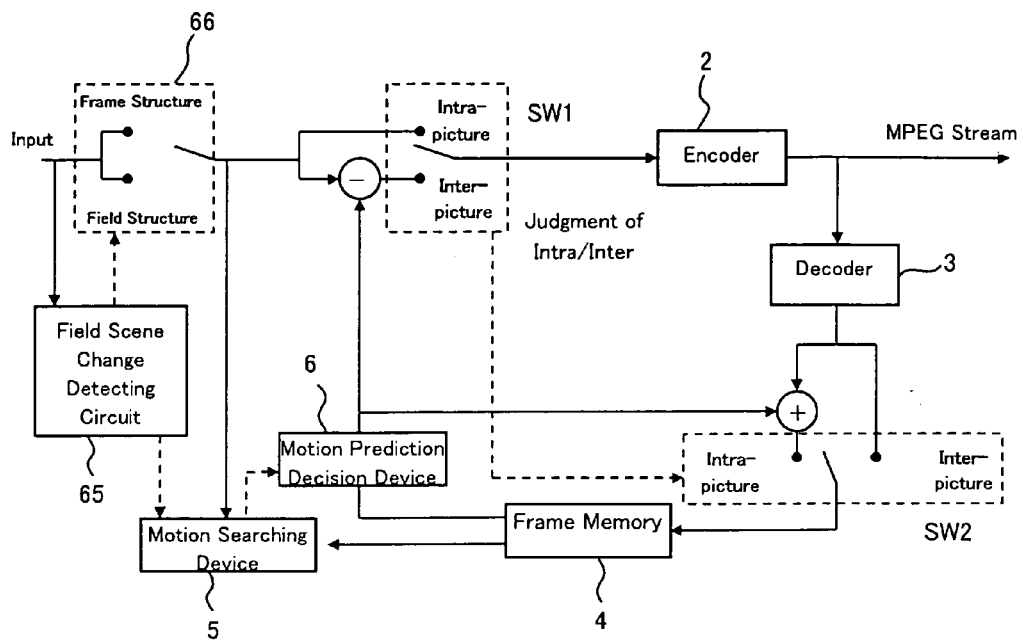
FIG. 13 is a diagram illustrating a fourth embodiment of the present invention.

FIG. 13 is a diagram illustrating a fourth embodiment of the present invention. Relative to the constitution of FIG. 5, there is provided a switching circuit 66, which performs the switching of the frame structure and field structure on the encoding input data side. The switching circuit 66 performs switching of the frame structure and field structure when the scene change detecting circuit 65 detects a case in which a scene change occurs between intra-frame fields, and the picture thereof is a B-picture.

When field structure encoding is performed, it is possible, for example, to perform forward prediction for one field picture, and backward prediction for another field picture, and prediction efficiency does not drop significantly.

Figure 14:
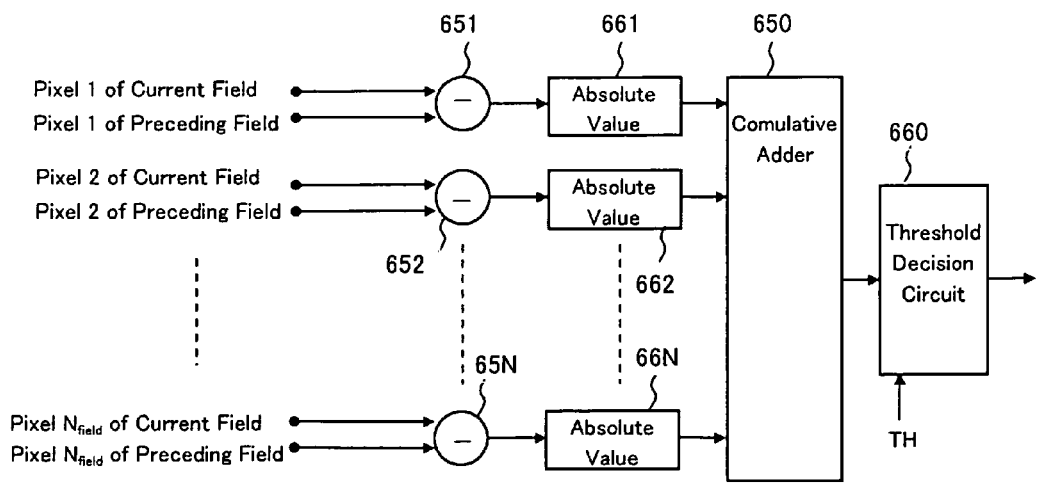
FIG. 14 is a block diagram of an example of a constitution of a scene change detecting circuit 65 in the embodiment of FIG. 13.

FIG. 14 is a block diagram of an example of a constitution of the scene change detecting circuit 65 in the embodiment of FIG. 13. In the figure, the pixel number is the order in which a field is raster scanned, and $N_{field}$ signifies the number of pixels in a field.

The scene change detecting circuit 65 is constituted having difference circuits 651-65N, which determine the difference between each pixel of the current field and preceding field in field units, absolute value circuits 66l-66N, which determine the absolute values of the outputs of the difference circuits, a cumulative adder 650, which cumulatively adds the outputs of the absolute value circuits 66l-66N, and a threshold decision circuit 660, which compares and determines the output of the cumulative adder 650 against a threshold TH.

That is, when the cumulative addition value of the absolute difference of 1 field exceeds the threshold TH, a discrimination decision output is generated from the threshold decision circuit 660.

Figure 15:
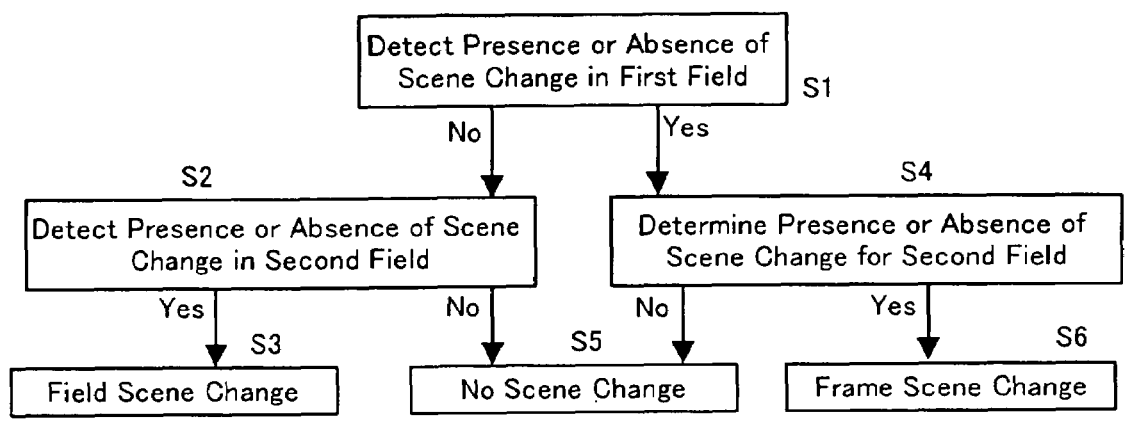
FIG. 15 is a diagram illustrating a detection algorithm of the scene change detecting circuit 65 of FIG. 13.
Figure 16:
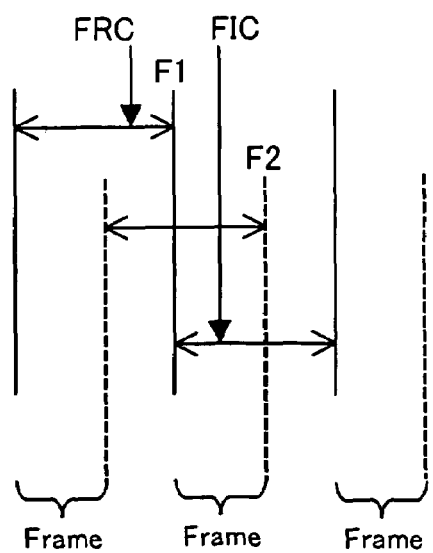
FIG. 16 is a diagram showing the relationship of a first field F1 and a second field F2 in the algorithm of FIG. 15.

FIG. 15 is a diagram illustrating a detection algorithm of the scene change detecting circuit 65, which detects a field scene change on the basis of a discrimination decision output from this threshold decision circuit 660. FIG. 16 is a diagram showing the relationship of a first field F1 and a second field F2 in the algorithm of FIG. 15.

The algorithm of FIG. 15 will be described with reference to this FIG. 16. The presence or absence of a scene change is detected in the first field F1, which is determined by the value of the top#field#first#flag (Step S1). When a scene change is not detected in the first field F1, the presence or absence of a scene change is detected in the second field F2 (Step S2).

At this time, when Step S2 determines that a scene change exists, the scene change is between the first field F1 and the second field F2, as shown in FIG. 16 (Step S3). Therefore, in this case, the scene change is determined to be a field scene change (FIC).

Further, when Step S2 determines that a scene change does not exist, a determination is made that there is no scene change (Step S5).

When there is a scene change in Step S1, next the presence or absence of a scene change is determined for the second field (Step S4). When there is no scene change in the second field, a determination is made that there is no scene change (Step S5). When there is a scene change in the second field, since this constitutes the fact that a scene change extends into the first field as shown in FIG. 16, the scene change is determined to be a frame scene change FRC in this case (Step S6).

Figure 17:
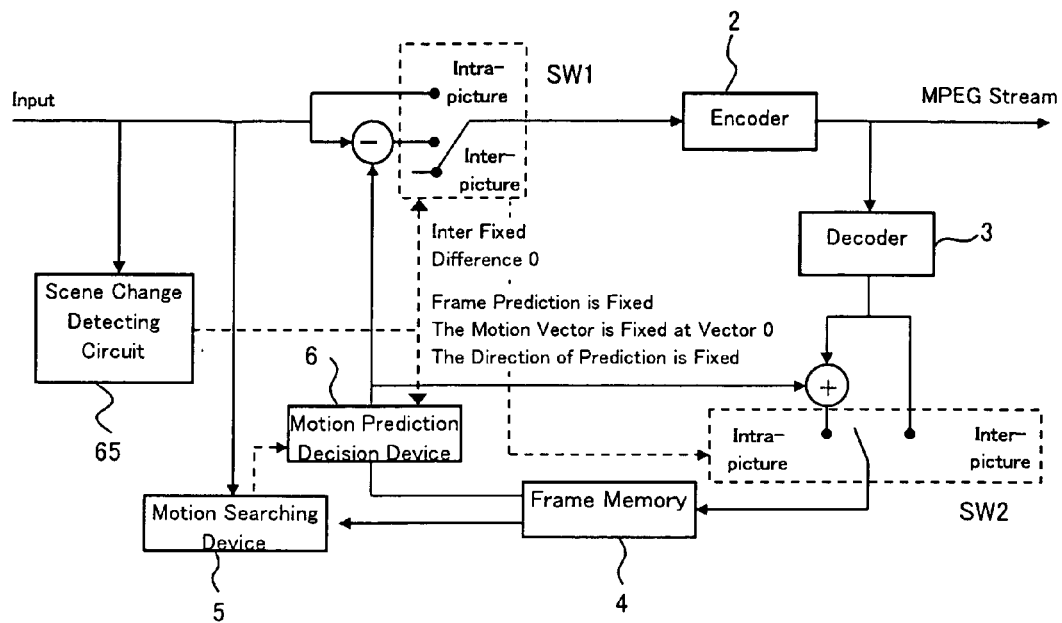
FIG. 17 is a diagram illustrating a fifth embodiment of the present invention.

FIG. 17 is a diagram illustrating a fifth embodiment of the present invention. This embodiment is characterized in that the motion prediction mode is limited.

When a scene change occurs between intra-frame fields, and the relevant picture is a B-picture as was described above with regard to the third solution principle, this embodiment realizes the encoding of an encoded frame as the same data as either a preceding or succeeding reference frame.

In the embodiment of FIG. 17, the constitution is such that the direction of motion vector prediction is fixed in one direction, frame prediction is fixed, the motion vector is fixed at vector 0, and encoding control is carried out so that even encoding coefficient data is not sent.

Therefore an encoded picture can be encoded as the same data as the locally-decoded frame of a reference picture in accordance with the solution principle illustrated in FIG. 3. The motion vector can also be fixed after all motion mode detection has been performed, and the constitution can also be designed so that no motion prediction mode operation is performed once this mode has been entered.

According to such a constitution, it is possible to prevent encoding efficiency from becoming extremely poor. In this case, because encoding is performed by treating an encoded picture the same as a reference picture that either comes before or after a scene change, actually a completely different picture is encoded for one field either before a scene change or after a scene change.

Further, with regard to the reference picture that is treated as the same data as a coded picture, the use of a reference picture that is closer, input time-wise, to a picture in which a scene change occurs is believed to be better, but it need not be limited to this.

Further, when a separate B-picture exists between a scene change-picture and a reference picture, also treating the pertinent B-picture as the same data as a reference picture is desirable from the visual and encoding efficiency standpoints.

Figure 18:
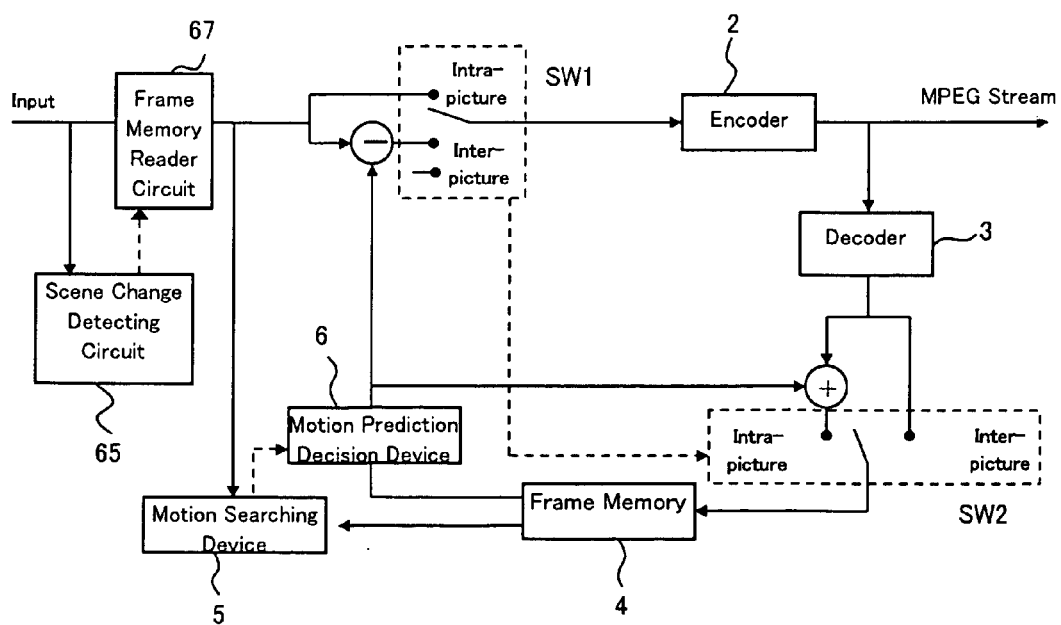
FIG. 18 is a diagram illustrating a sixth embodiment of the present invention.

FIG. 18 is a diagram illustrating a sixth embodiment of the present invention. This embodiment is characterized by the fact that encoding input data is switched. In the constitution of FIG. 18, a frame memory readout circuit 67 is provided on the data input side, and as a method for treating a coded picture as the same data as a reference picture as in the above-mentioned constitution of FIG. 17, when setting encoding data from an inputted frame, the reference picture to be treated as the same data is set.

Figure 19:
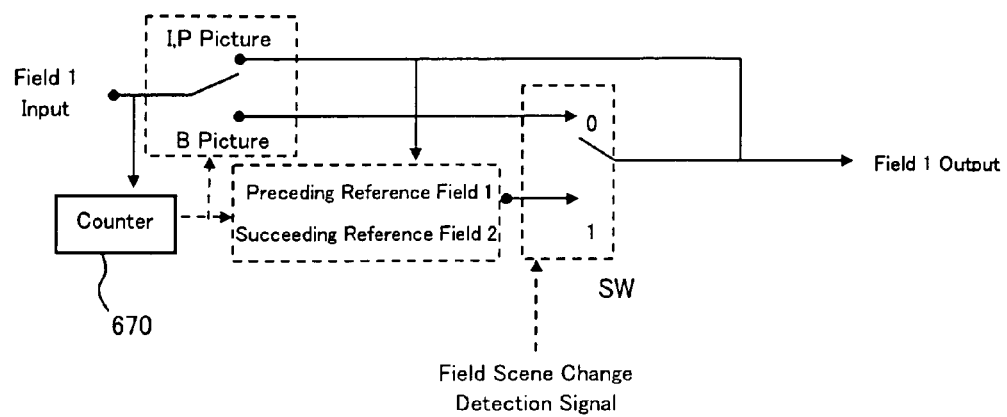
FIG. 19 is an example of a constitution of the frame memory readout circuit 67 of FIG. 18.

FIG. 19 is an example of a constitution of the frame memory readout circuit 67 of FIG. 18. Furthermore, FIG. 19 shows a readout circuit for field 1 input, and since the same constitution is used for field 2, the constitution therefor is omitted from the figure.

The constitution of FIG. 19 has a switch, which is switched in accordance with a scene change detection signal from a scene change detecting circuit 65, and when there is a B-picture, and a field scene change, the same data as that of either a preceding reference picture or a succeeding reference picture is outputted in accordance with the switch SW. A counter 670 generates the timing for switching I, P, and B-pictures.

With MPEG-2, since a motion search is generally performed here using original pictures, an original of a reference picture can be stored in memory. Further, a post-motion compensation prediction picture is achieved using a locally-decoded picture resulting from the one-time encoding/decoding of a reference picture. Consequently, a decoded reference picture can also be stored in memory.

Therefore, the reference picture set as an original picture here can be set as either an original picture/locally-decoded picture. Further, since the coded frame is changed, the limits of the encoding method shown in the embodiment of FIG. 17 are not particularly necessary.

Here, since the same data as that of a reference picture is used in encoding in the embodiments of FIG. 17, FIG. 18, practically no data is generated in the pertinent picture. Consequently, there is also an effect, whereby data can be allocated to another picture within the GOP.

Figure 20:
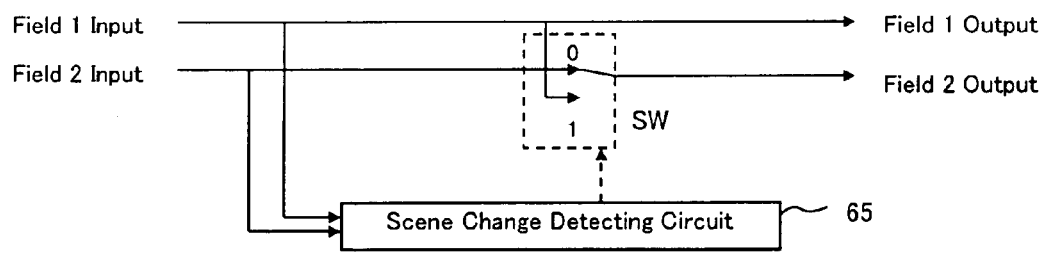
FIG. 20 is a diagram illustrating a seventh embodiment of the present invention.

FIG. 20 is a diagram illustrating a seventh embodiment of the present invention. With this embodiment, the present invention can be applied without necessarily linking up to an encoding apparatus. That is, this embodiment can be used as an input picture switching apparatus capable of being used in common applications.

Data of field 1 and field 2, which constitute 1 frame, are inputted, and a scene change detecting circuit 65 immediately detects a scene change between intra-frame fields when there is a scene change therebetween.

When the scene change detecting circuit 65 detects the occurrence of a field scene change, a switching signal is generated, a switch SW is switched to the terminal 1 side, and the same data as that of field 1 is outputted for field 2.

In this manner, when a field scene change is detected, a field is repeated in the pertinent frame, and the input frame is remade. By repeating one field, it is possible to artificially change the location of a scene change between intra-frame fields to an inter-frame scene change in accordance with the solution principle illustrated in FIG. 4.

Figure 21:
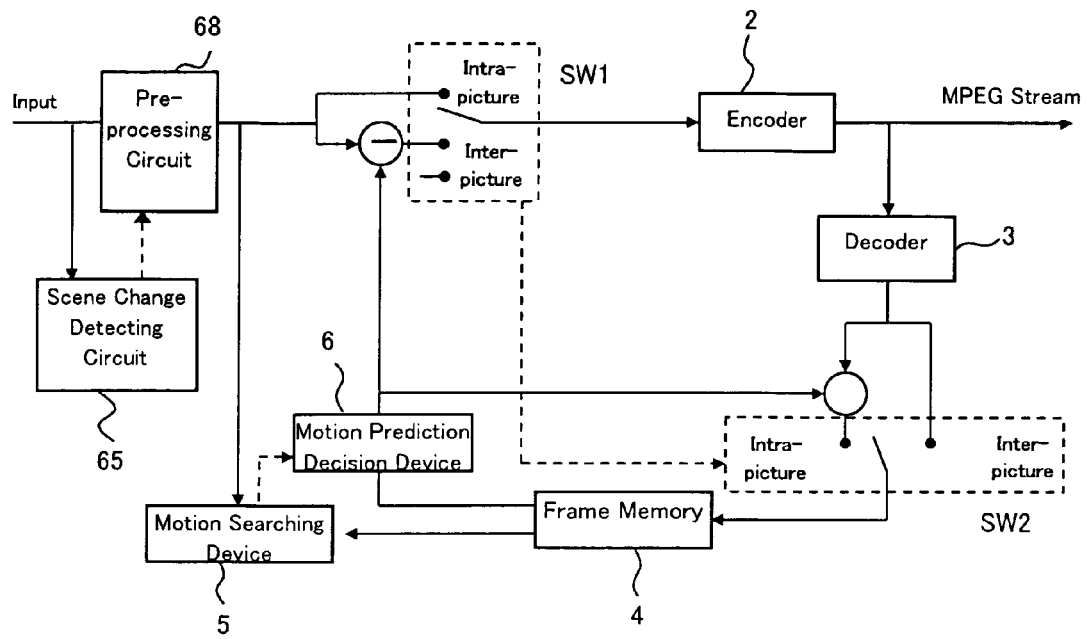
FIG. 21 is a diagram illustrating an eighth embodiment of the present invention.

FIG. 21 is a diagram illustrating an eighth embodiment of the present invention. This embodiment is a constitution, which applies the embodiment of FIG. 20 to an encoding apparatus. The embodiment of FIG. 20 is used as the pre-processing circuit 68 of FIG. 21.

Figure 22:
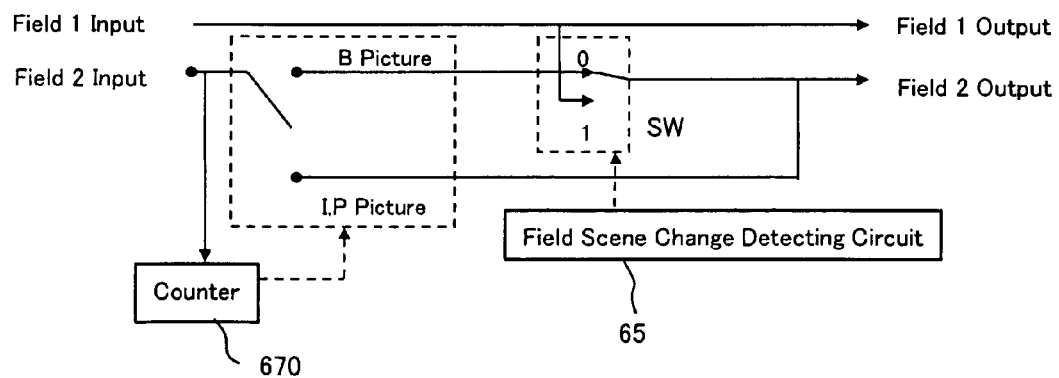
FIG. 22 is an example of a constitution of the pre-processing circuit 68 of FIG. 21.

FIG. 22 is an example of a constitution of the pre-processing circuit 68 in FIG. 21. This embodiment is constituted such that, when a scene change detecting circuit 65 detects a field scene change, field 1 data is repeated and outputted for field 2 in accordance with a switch SW. Furthermore, the function of a counter 670 is the same as that described in the embodiment of FIG. 19.

In actual encoding in accordance with this embodiment, processing is performed at a scene change between intra-frame fields in a B-picture for which encoding efficiency is poor. If a scene change is an inter-frame scene change, predictive encoding can be efficiently performed for a B-picture from preceding and succeeding reference pictures by simply using an I-picture or intra-picture encoding on a reference picture immediately following, input time-wise, a scene change.

The thinking behind the eighth embodiment is similar to that of the embodiment of FIG. 18 in the sense that a coded picture is encoded as a different picture from the actual inputted picture, but in the embodiment of FIG. 21, when a scene change occurs between fields, a frame is not replaced with a reference picture, but rather both fields within the frame are made to have the same data by repeating one field in an inputted original picture as illustrated in FIG. 4.

Figure 23:
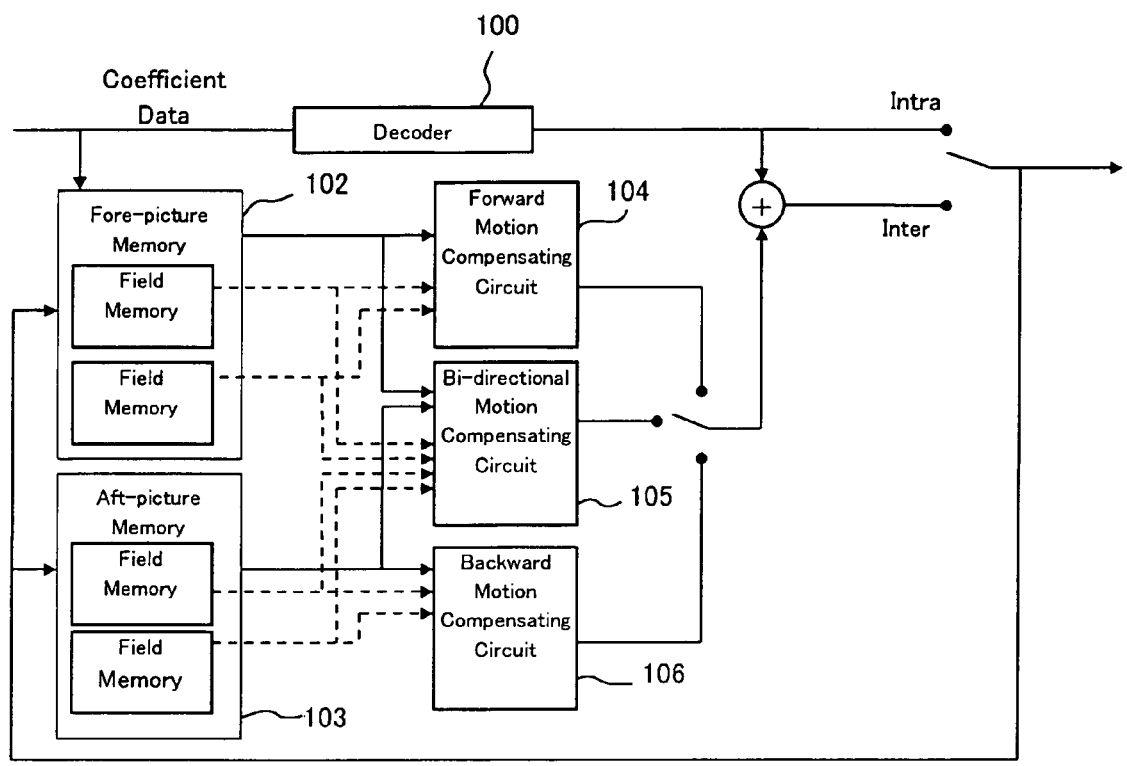
FIG. 23 is a block diagram of an example of a constitution of a decoding apparatus corresponding to an encoding apparatus based on the solution principles illustrated by FIG. 1-FIG. 4.

FIG. 23 is a block diagram of an example of a constitution of a decoding apparatus corresponding to an encoding apparatus based on the solution principles illustrated in accordance with FIG. 1-FIG. 4 above.

A signal, wherein the output of a decoder 100 is added to a motion compensation signal either directly or via an adder 101 by switching a switch SW, is outputted as a decoded signal.

To generate a motion compensation signal, this decoding apparatus has a fore-picture memory 102 and an aft-picture memory 103, and also has a forward motion compensating circuit 104, a bi-directional motion compensating circuit 105, and a backward motion compensating circuit 106.

In FIG. 23, the solid line arrows for data read out of memory 102, 103 indicate frame prediction, and the broken line arrows indicate field prediction. And the types thereof can be switched in each macro-block.

Here, the macro-block (MB) data in an MPEG stream outputted from an encoding apparatus comprises MB location, prediction type, which distinguishes between forward, backward and bi-directional prediction, motion vectors, and encoding coefficient data.

In the current MPEG-2 standard, the number of motion vectors at frame structure encoding, as shown in Table 1, is 1 vector for one direction in the case of frame prediction, and 2 vectors for one direction in the case of field prediction.

The data on the stream in this case is as follows.

In the case of frame prediction of one (forward or backward) direction prediction:
prediction type+motion vector 1

In the case of field prediction of one (forward or backward) direction prediction:
prediction type+motion vector 1+motion vector 2

The above-mentioned motion vector 1 is a top#field (odd field) vector, and motion vector 2 is a bottom#field (even field) vector.

In the case of frame prediction of bi-directional prediction:
prediction type+motion vector 1+motion vector 2. Motion vector 1 is a forward#frame vector, and motion vector 2 is a backward#frame vector.

Furthermore, in the case of field prediction of bi-directional prediction:
prediction type+motion vector 1+motion vector 2+motion vector 3+motion vector 4

Motion vector 1 is a forward#top#field vector, motion vector 2 is a forward#bottom#field vector, motion vector 3 is a backward#top#field vector, and motion vector 4 is a backward#bottom#field vector.

For bi-directional field prediction according to the present invention, motion vectors are one direction 1 vector, and constitute
prediction type+motion vector 1+motion vector 2 Motion vector 1 is a forward#field vector, and motion vector 2 is a backward#field vector.

This can be taken in 2 ways, that is, motion vector 1 is a forward#top#field vector, and motion vector 2 is a backward#bottom#field vector, or motion vector 1 is a forward#bottom#field vector, and motion vector 2 is a backward#top#field vector, and which way is taken is determined by a top#field#first#flag.

Figure 24:
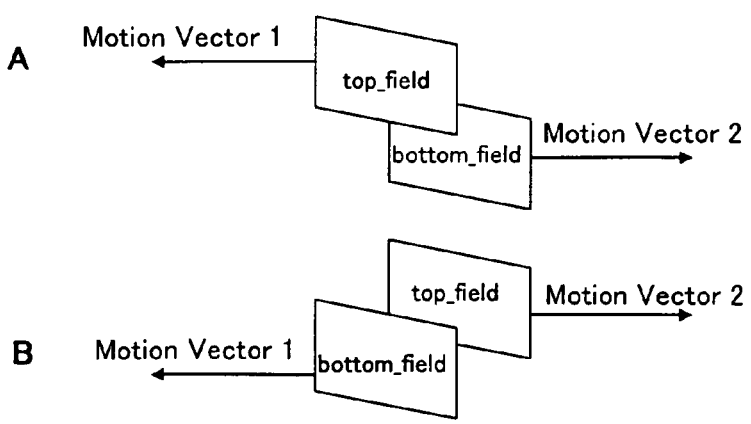
FIG. 24 is a diagram illustrating the significance of top#field#first#flag in field prediction of the present invention.

FIG. 24 is a diagram illustrating the same concept as that of FIG. 11. FIG. 24 is a diagram showing the modes of motion vector 1, and motion vector 2, which are determined by the top#field#first#flag. That is, when top#field#first#flag=1, as shown in FIG. 24A, motion vector 1 is a forward#top#field vector, and motion vector 2 is a backward#bottom#field vector.

Conversely, when top#field#first#flag=0, as shown in FIG. 24B, motion vector 1 is a forward#bottom#field vector, and motion vector 2 is a backward#top#field vector.

Figure 25:
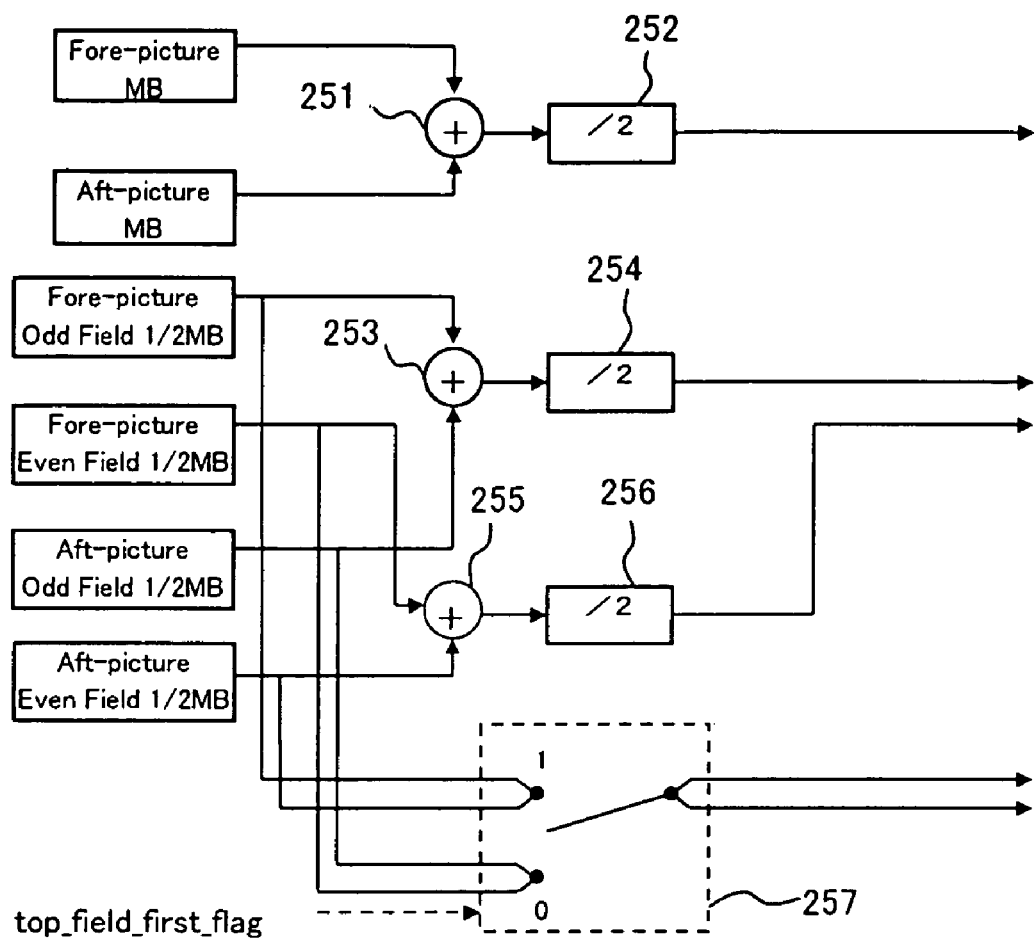
FIG. 25 is a block diagram of an example of a constitution of the bi-directional motion compensating circuit 105 of FIG. 23.
Figure 26:
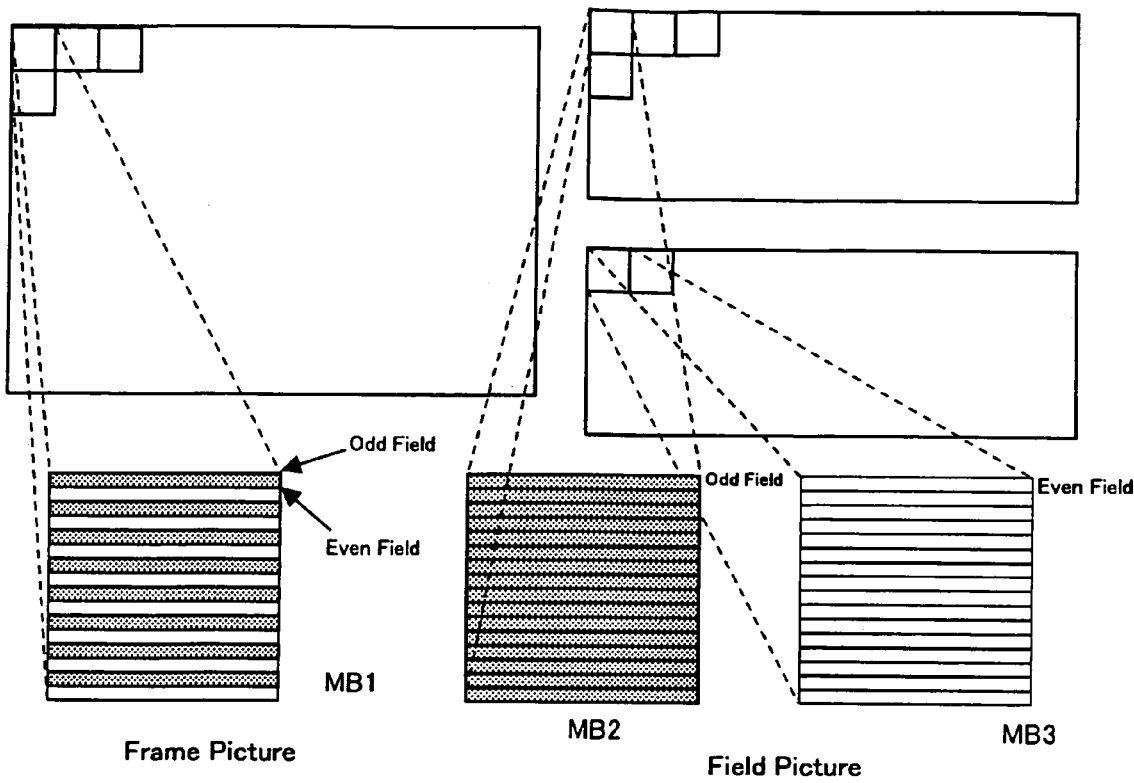
FIG. 26 is a diagram illustrating a picture.

FIG. 25 is a block diagram of an example of a constitution of the bi-directional motion compensating circuit 105 of FIG. 23.

In the case of frame prediction, a macro-block of a frame constitution of a location equivalent to each motion vector is read out from fore-picture memory 102, and aft-picture memory 103, and ½ the sum of the addition thereof is calculated, and outputted in accordance with an adding circuit 251, and a ½ circuit 252.

In the case of field prediction, 4 ½ macro-blocks, which are equivalent to the locations of 4 motion vectors, are read out from memory 102, 103. These are a fore-picture odd field ½ macro-block, a fore-picture even field ½ macro-block, an aft-picture odd field ½ macro-block, and an aft-picture even field ½ macro-block.

Next, the odd field ½ macro-block of the fore-picture, and the odd field ½ macro-block of the aft-picture are inputted, and ½ the sum of the addition thereof is calculated, and outputted in accordance with an adding circuit 253, and a ½ circuit 254.

Further, the fore-picture even field ½ macro-block, and the aft-picture even field ½ macro-block are inputted, and ½ [the sum] of the addition thereof is calculated, and outputted in accordance with an adding circuit 255, and a ½ circuit 256.

Furthermore, in the case of field prediction according to the present invention, a determination is made on the basis of the above-mentioned top#field#first#flag whether a combination of a fore-picture odd field ½ macro-block and an aft-picture even field ½ macro-block, or a combination of a fore-picture even field ½ macro-block and an aft-picture odd field ½ macro-block, which is equivalent to 2 motion vectors, is read out from memory 102, 103. The decided combination is outputted as a macro-block from a selection circuit 257.

As described above, according to the present invention, even when scene change detection occurs during frame structure encoding in a B-picture, and in a place that is not a break in a frame picture, efficient encoding can be performed without a deterioration of prediction efficiency.

In each of the above embodiments, operation was described using the constitution of the hardware block, but the present invention is not limited to hardware, and a corresponding function can also be achieved using software.

Furthermore, examples of each of the above embodiments were provided for an understanding of the present invention, but the scope of the protection of the present invention is not limited thereto. So long as same does not depart from the idea of the present invention, a moving pictures encoding method and apparatus that is equivalent to a constitution in the claims is also included in the scope of protection of the present invention.

What is claimed is:

1. A moving pictures encoding method for encoding a picture frame of an input signal by predicting from both forward and backward picture frames, the picture frame having top and bottom fields, which respectively include odd numbers and even numbers of pixel scanning lines of the picture frame, the method comprising the steps of:

first predicting in a macro-block unit composed of (n×n) pixels, the top field of the picture frame from either one of top and bottom fields of only the forward picture frame, and the bottom field of the picture frame from either one of top and bottom fields of only the backward picture frame;

generating a predictive picture according to the prediction; and encoding the picture frame of the input signal by using the generated predictive picture.

2. The moving pictures encoding method according to claim 1, further comprising the steps of:

second predicting in the macro-block unit, the top and bottom fields of the picture frame from both the forward and backward picture frames; and selectively performing the first predicting.

3. The moving pictures encoding method according to claim 2, further comprising the step of detecting if there is a scene change between the top and bottom fields of the picture frame of the input signal; and wherein when the scene change is detected, the first predicting is performed.

4. A moving pictures encoding apparatus, in which a picture frame of an input signal is encoded by predicting from both forward and backward picture frames, the picture frame having top and bottom fields, which respectively include odd numbers and even numbers of pixel scanning of the picture frame, the moving pictures encoding apparatus comprising:

field motion vector detecting means for performing first predicting in a macro-block unit composed of (n×n) pixels, the top field of the picture frame from either one of top and bottom fields of only the forward picture frame, and the bottom field of the picture frame from either one of top and bottom fields of only the backward picture frame;

motion compensating means for generating a predictive picture according to the prediction; and encoding means for encoding the picture frame of an input signal using the generated predictive picture.

5. The moving pictures encoding apparatus according to claim 4, further comprising prediction mode selecting means for selecting whether or not second predicting in the macro-block unit, the top and bottom fields of the picture frame from both the forward and backward picture frames; and selectively performing the first predicting.

6. The moving pictures encoding apparatus according to claim 5, further comprising a detecting means for detecting if there is a scene change between the top and bottom fields of the picture frame of the input signal; and wherein the field motion vector detecting means performs the first predicting, when the scene change is detected.

* * * * *